US009035976B2

(12) United States Patent
Lee et al.

(10) Patent No.: US 9,035,976 B2
(45) Date of Patent: May 19, 2015

(54) ORGANIC LIGHT EMITTING DIODE DISPLAY DEVICE FOR SENSING PIXEL CURRENT AND PIXEL CURRENT SENSING METHOD THEREOF

(71) Applicant: LG Display Co., Ltd., Seoul (KR)

(72) Inventors: Ji-Eun Lee, Seoul (KR); Bum-Sik Kim, Gyeonggi-do (KR); Seung-Tae Kim, Gyeonggi-do (KR); Won-Kyu Ha, Gyeonggi-do (KR); Kil-Hwan Oh, Seoul (KR)

(73) Assignee: LG Display Co., Ltd., Seoul (KR)

( * ) Notice: Subject to any disclaimer, the term of this patent is extended or adjusted under 35 U.S.C. 154(b) by 150 days.

(21) Appl. No.: 13/711,789

(22) Filed: Dec. 12, 2012

(65) Prior Publication Data

US 2014/0022289 A1 Jan. 23, 2014

(30) Foreign Application Priority Data

Jul. 19, 2012 (KR) ........................ 10-2012-0078520

(51) Int. Cl.
*G09G 3/32* (2006.01)
*G09G 5/10* (2006.01)
(Continued)

(52) U.S. Cl.
CPC ................ *G09G 3/3283* (2013.01); *G09G 5/10* (2013.01); *G09G 3/006* (2013.01); (Continued)

(58) Field of Classification Search
CPC ............. G09G 5/00; G09G 5/10; G09G 3/00; G09G 3/30; G09G 3/038; G09G 3/3241; G09G 2310/00; G09G 2310/027; G09G 2310/0294; G09G 2310/0297; G06F 3/00; G06F 3/038
USPC ...................... 345/76, 77, 204, 206, 212, 691
See application file for complete search history.

(56) References Cited

U.S. PATENT DOCUMENTS

| | | | |
|---|---|---|---|
| 7,619,597 | B2 | 11/2009 | Nathan et al. |
| 7,834,825 | B2 | 11/2010 | Mizukoshi et al. |

(Continued)

FOREIGN PATENT DOCUMENTS

| | | | |
|---|---|---|---|
| CN | 101123066 | A | 2/2008 |
| CN | 102074189 | A | 5/2011 |
| KR | 10-2009-0043301 | A | 5/2009 |

OTHER PUBLICATIONS

English machine translation of Kr-1020070109082 Title: Organic Light Emitting Display and a driving method thereof, capable of controlling a data supplied to sub pixel Inventor: Hong, Yeong Jun Publication date: Jun. 5, 2009.*

(Continued)

*Primary Examiner* — Amr Awad
*Assistant Examiner* — Wing Chow
(74) *Attorney, Agent, or Firm* — Morgan, Lewis & Bockius LLP

(57) ABSTRACT

The present invention relates to an organic light emitting diode display device capable of sensing driving current of each pixel with a simple configuration to compensate for a luminance deviation between pixels and a pixel current sensing method thereof. The organic light emitting diode display device includes a display panel including 2N (N being a natural number) pixels that share a reference line though which a reference signal is supplied and are respectively connected to 2N data lines through which data signals are applied, and a data driver for driving the 2N pixels sharing the reference line in a time division manner through the data lines, sensing currents of the time-division-driven 2N pixels as voltages through the shared reference line and outputting the sensed currents, in a sensing mode.

15 Claims, 13 Drawing Sheets

(51) Int. Cl.
*G06F 3/038* (2013.01)
*G09G 3/00* (2006.01)

(52) U.S. Cl.
CPC . *G09G 2310/0251* (2013.01); *G09G 2320/043* (2013.01); *G09G 2330/12* (2013.01); *G09G 3/3233* (2013.01); *G09G 3/3291* (2013.01)

(56) References Cited

U.S. PATENT DOCUMENTS

| | | | | |
|---|---|---|---|---|
| 7,924,249 | B2 | 4/2011 | Nathan et al. | |
| 8,232,939 | B2 | 7/2012 | Nathan et al. | |
| 2008/0036703 | A1 | 2/2008 | Wang et al. | |
| 2010/0073357 | A1 | 3/2010 | Min et al. | |
| 2010/0214273 | A1 * | 8/2010 | Shirouzu et al. | 345/205 |
| 2010/0253659 | A1 | 10/2010 | Sugimoto et al. | |
| 2011/0122119 | A1 | 5/2011 | Bae et al. | |

OTHER PUBLICATIONS

Office Action issued in counterpart Korean Patent Application 10-2012-0078520 dated Mar. 19, 2014.
Combined Search and Examination Report issued in counterpart Great Britain Patent Application No. 1223069.4 dated May 30, 2013.
Office Action dated Feb. 15, 2015, issued by the State Intellectual Property Office of China in Chinese Patent Application No. 201210566816.1.

* cited by examiner

ORGANIC LIGHT EMITTING DIODE DISPLAY DEVICE FOR SENSING PIXEL CURRENT AND PIXEL CURRENT SENSING METHOD THEREOF

This application claims the benefit of Korean Patent Application No. 10-2012-0078520, filed on Jul. 19, 2012, which is hereby incorporated by reference as if fully set forth herein.

BACKGROUND OF THE INVENTION

1. Field of the Invention

The present invention relates to an organic light emitting diode display device, and more particularly, to an organic light emitting diode display device capable of sensing driving current of each pixel with a simple configuration to compensate for a luminance deviation between pixels and a pixel current sensing method thereof.

2. Discussion of the Related Art

An organic light emitting diode (OLED) display device is a self-emission element that makes an organic emission layer emit light according to recombination of electrons and holes. The OLED display device is expected to be a next-generation display device since it is ultra-thin and has high brightness and low driving voltage.

Each pixel constituting the OLED display device includes an OLED composed of an anode, a cathode and an organic emission layer interposed between the anode and the cathode, and a pixel driving circuit that independently drive the OLED. The pixel driving circuit includes a switching thin film transistor (TFT), a capacitor and a driving TFT. The switching TFT charges the capacitor with a voltage corresponding to a data signal in response to a scan pulse. The driving TFT controls emission of the OLED by adjusting current supplied to the OLED according to the level of voltage charged in the capacitor. The emission of the OLED is proportional to current supplied from the driving TFT.

However, in the OLED display device, pixels may have different driving TFT threshold voltages Vth and mobility due to process variation, causing OLED driving current to be different for respective OLEDs, generating a deviation in characteristics of driving TFTs of the pixels. In general, an initial driving TFT characteristic difference generates unevenness or a pattern on a screen and a characteristic difference due to deterioration of driving TFTs, which occurs when the driving TFTs drive OLEDs, reduces the lifespan of an AMOLED display panel or generates a residual image.

To solve these problems, a prior art patent such as U.S. Pat. No. 7,834,825 discloses a method of sensing current of each pixel and compensating for input data according to the sensing result. However, since this technique uses a method of sensing current flowing to a power line (VDD or VSS line) of the panel while turning pixels on, current sensing time increases due to a parasitic capacitor located in parallel with the power line, making high-speed sensing difficult when resolution increases.

Furthermore, although a plurality of current sensing circuits may simultaneously sense currents of a plurality of pixels, this increases circuit scale. Therefore, while the conventional technology can compensate for an initial characteristic deviation among driving TFTs by measuring the initial characteristic deviation during a test process performed before products are shipped, the conventional technology has difficulty in sensing and compensating for characteristic deviation due to deterioration of the driving TFTs, which occurs when OLEDs have been driven after products are shipped.

SUMMARY OF THE INVENTION

An object of the present invention is to provide an OLED display device for sensing pixel current which is capable of rapidly sensing current of each pixel to compensate for a luminance deviation among pixels and a pixel current sensing method thereof.

An object of the present invention is to provide an OLED display device for sensing pixel current, which is capable of reducing the scale of a pixel current sensing circuit included therein, and a pixel current sensing method thereof.

According to an aspect of the present invention, there is provided an organic light emitting diode (OLED) display device, including: a display panel including 2N (N being a natural number) pixels that share a reference line though which a reference signal is supplied and are respectively connected to 2N data lines through which data signals are applied; and a data driver for driving the 2N pixels sharing the reference line in a time division manner through the data lines, sensing currents of the time-division-driven 2N pixels as voltages through the shared reference line and outputting the sensed currents, in a sensing mode.

The data driver may divide a sensing period for the 2N pixels sharing the reference line into 2N time-division sensing periods and, in each of the 2N time-division sensing periods, the data driver may select a pixel to be sensed from the 2N pixels through a data line corresponding to the pixel to be sensed and de-select the other pixel through a data line corresponding to the other pixel.

In each time-division sensing period, the data driver may select the pixel to be sensed by supplying a data voltage for sensing to the data line corresponding to the pixel to be sensed to drive the pixel, and de-select the other pixel by supplying a black data voltage or an off voltage to the data line corresponding to the other pixel to prevent the other pixel from being driven.

Each of the 2N pixels may include a light-emitting element, a driving thin film transistor (TFT) for driving the light-emitting element, a first switching TFT for supplying a data signal of the corresponding data line to a first node connected to a gate electrode of the driving TFT in response to a scan signal of a scan line, a second switching TFT for supplying a reference signal of the reference line to a second node connected between the driving TFT and the light-emitting element in response to a different scan signal of a different scan line, and a storage capacitor for charging a voltage between the first and second nodes and providing the charged voltage as a driving voltage of the driving TFT, wherein each of the time-division sensing periods includes an initialization period in which the first and second switching TFTs of each pixel are turned on such that the first and second nodes are respectively initialized to the data signal from the corresponding data line and the reference signal of the reference line, a precharge period in which only the second switching TFT is turned off and the reference line is precharged with a precharge voltage, a discharge period in which the first and second switching TFTs are turned on such that pixel current of the driving TFT flows to the reference line, and a sampling period in which the first and second switching TFTs are turned off and the pixel current of the driving TFT is sampled with a saturated voltage of the reference line and held.

The 2N pixels that share the reference line may include two pixels that are located on both sides of the shared reference line between two neighboring data lines and respectively connected to the two data lines.

The reference line may be branched to N branch reference lines, and every two pixels from among the 2N pixels that share the reference line may share the N branch reference lines, the two pixels being located on both sides of the shared branch reference lines between two neighboring data lines and respectively connected to the two data lines.

The first switching TFTs of the two pixels may share a first scan line through which a first scan signal is supplied and the second switching TFTs of the two pixels may share a second scan line through which a second scan signal is supplied.

The first switching TFTs of the two pixels may share a first scan line through which a first scan signal is supplied, the second switching TFT of one of the two pixels may be connected to a second scan line through which a second scan signal is supplied, and the second switching TFT of the other of the two pixels may b connected to a third scan line through which a third scan signal is supplied, wherein the second scan signal and the third scan signal respectively provide voltages having opposite polarities only during the discharge period to form a current path between the driving TFT of a pixel to be sensed and the shared reference line and to open a current path between the driving TFT of the other pixel and the shared reference line.

The data driver may include: a first digital-to-analog converter (DAC) for converting input data into the data signal and outputting the data signal to a data channel individually connected to the data line; a second DAC for converting input reference data into the reference signal and outputting the reference signal to a reference channel individually connected to the reference line; a sample and hold unit for sampling the voltage of the reference line through the reference channel, holding the sampled voltage as a sensing voltage and outputting the held sensing voltage; an analog-to-digital converter (ADC) for converting the sensing voltage from the sample and hold unit into digital data and outputting the digital data; a first switch through which output of the first DAC is supplied to the data channel during the initialization period to the discharge period; a second switch through which output of the second DAC is supplied to the reference channel during the initialization period and the discharge period; and a third switch through which the precharge voltage is supplied to the reference channel, wherein the first, second and third switches are turned off during the sampling period.

The data driver may further include a multiplexer connected between the reference channel and the sample and hold unit to selectively connect at least two reference channels to an input channel of the sample and hold unit, and the number of sample and hold units and the number of ADCs correspond to the number of output channels of the multiplexer.

The number of reference lines may correspond to half the number of data lines, and the number of reference channels respectively connected to the reference lines in the data driver may correspond to half the number of data lines.

The number of branch reference lines may correspond to half the number of data lines, and the number of reference channels respectively connected to the reference lines in the data driver may correspond to half the number of data lines.

According to another embodiment of the present invention, there is provided a method of sensing pixel current of an OLED display device which includes 2N (N being a natural number) pixels that share a reference line though which a reference signal is supplied and are respectively connected to 2N data lines through which data signals are applied, the method including: driving the 2N pixels sharing the reference line in a time division manner through the data lines in a sensing mode; and sensing currents of the time-division-driven 2N pixels as voltages through the shared reference line and outputting the sensed currents.

The driving of the 2N pixels in a time division manner may include dividing a sensing period for the 2N pixels into 2N time-division sensing periods, selecting a pixel to be sensed from the 2N pixels through a data line corresponding to the pixel and de-selecting the other pixel through a data line corresponding to the other pixel in each of the 2N time-division sensing periods.

Each of the time division sensing periods may include: an initialization period in which the first and second switching TFTs of each pixel are turned on such that the first and second nodes are respectively initialized to the data signal from the corresponding data line and the reference signal of the reference line; a precharge period in which only the second switching TFT is turned off and the reference lines is precharged with a precharge voltage; a discharge period in which the first and second switching TFTs are turned on such that pixel current of the driving TFT flows to the reference line; and a sampling period in which the first and second switching TFTs are turned off and the pixel current of the driving TFT is sampled with a saturated voltage of the reference line and held.

The 2N pixels that share the reference line may include two pixels that are located on both sides of the shared reference line between two neighboring data lines and respectively connected to the two data lines, the first switching TFTs of the two pixels may be turned on in response to a first scan signal during the initialization period to the discharge period and turned off during the sampling period, the second switching TFTs of the two pixels may b turned on in response to a second scan signal during the initialization period and the discharge period and turned off during the precharge period and the sampling period.

The first switching TFTs of the two pixels may be turned on in response to a first scan signal during the initialization period to the discharge period and turned off during the sampling period, and the second switching TFTs of the two pixels may be turned on in response to second and third scan signals, respectively, during the initialization period and turned off during the precharge period and the sampling period, wherein the second switching TFT of a pixel to be sensed from the two pixels is turned on and the second TFT of the other pixel is turned off during the discharge period.

The reference line may be branched to N branch reference lines, and every two pixels from among the 2N pixels that share the reference line may share the N branch reference lines, the two pixels being located on both sides of the shared branch reference lines between two neighboring data lines and respectively connected to the two data lines, the first switching TFTs of the two pixels being turned on in response to a first scan signal during the initialization period to the discharge period and turned off during the sampling period, the second switching TFTs of the two pixels being turned on in response to a second scan signal during the initialization period and the discharge period and turned off during the precharge period and the sampling period.

Each of the time division sensing periods may include: outputting the data signal through a data channel individually connected to the data line and outputting the reference signal to a reference channel individually connected to the reference line during the initialization period; maintaining output of the data signal through the data channel and outputting a precharge voltage through the reference channel during the precharge period; outputting the data signal through the data channel and outputting the reference signal through the reference channel during the discharge period; blocking output of the data signal and reference signal, sampling and holding currents of the time-division-driven pixels through the reference channel as voltages during the sampling period; converting the held voltage into digital data and outputting the digital data after the sampling period.

At least two reference channels may be selectively connected to an input channel of the sample and hold unit through a multiplexer.

As described above, according to the OLED display device for sensing pixel current and the pixel current sensing method thereof according to the present invention, at least two pixels adjacent to each other in the horizontal direction share a reference line, and at least two pixels sharing each reference line are time-division-driven to sense characteristics of the at least two pixels through the reference line and reference channel shared by the pixels, and thus the number of reference lines and the number of reference channels can be reduced to lower than half the number of data lines. A reduction in the number of reference lines can increase a pixel aperture ratio, compared to a conventional OLED display device in which pixels do not share a reference line. In addition, a reduction in the number of reference channels can decrease the size or number of data driver ICs, compared to the conventional OLED display device in which pixels do not share a reference line.

Furthermore, the OLED display device for sensing pixel current and the pixel current sensing method thereof according to the present invention can easily sense current of each pixel at a high speed through a data driver. Accordingly, the present invention can sense and compensate for not only an initial characteristic deviation among driving TFTs but also a characteristic deviation due to deterioration of the driving TFTs by inserting a sensing mode between display modes in which the OLED display device is driven and sensing current of each pixel after shipment of products as well as during a test process before shipment of products. Accordingly, the lifespan and picture quality of the OLED display device can be improved.

DETAILED DESCRIPTION OF THE INVENTION

Preferred embodiments of the present invention will be described in detail with reference to the attached drawings.

Figure 1:
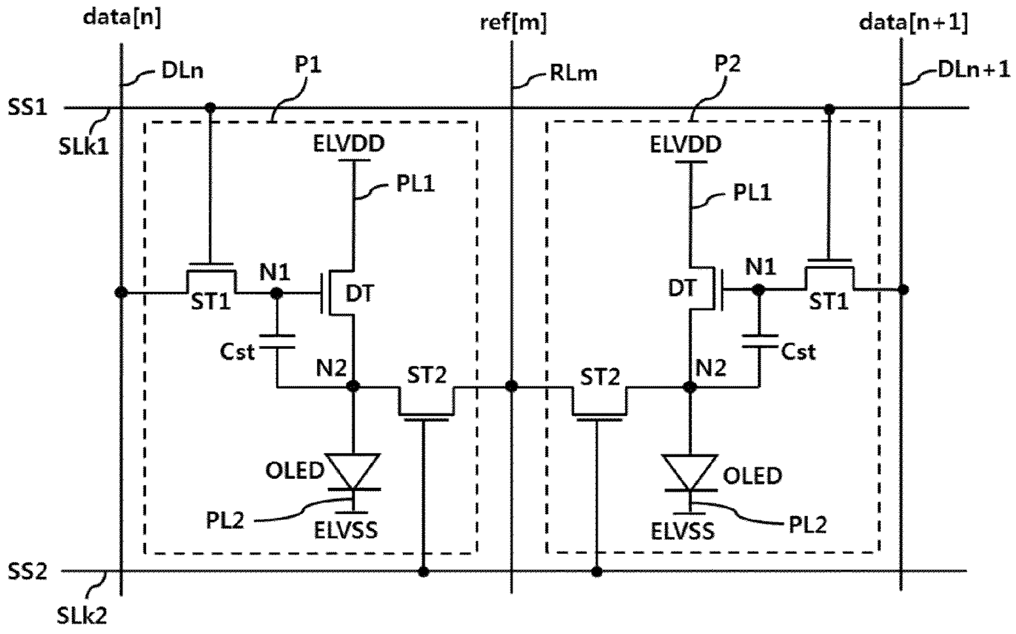
FIG. 1 is an equivalent circuit diagram of two typical pixels of an OLED display device for sensing pixel current according to a first embodiment of the present invention.

FIG. 1 is an equivalent circuit diagram of two typical pixels of an OLED display device for sensing pixel current according to a first embodiment of the present invention.

The OLED display device shown in FIG. 1 includes first and second pixels P1 and P2 respectively connected to two neighboring data lines DLn and DLn+1 (n being a natural number), a reference line RLm (m being a natural number) shared by the first and second pixels P1 and P2 between the data lines DLn and DLn+1, and first and second scan lines SLk1 and SLk2 (k being a natural number) that intersect the data lines DLn and DLn+1 and the reference line RLm and are shared by the first and second pixels P1 and P2.

The first and second pixels P1 and P2 arranged in the horizontal direction respectively represent first and second pixel strings that share the reference line RLm. The first and second pixels P1 and P2 are respectively connected to the two data lines DLn and DLn+1 extended in the vertical direction. The reference line RLm commonly connected to the first and second pixels P1 and P2 is arranged in parallel with the two data lines DLn and DLn+1 between the data lines DLn and DLn+1. The first and second pixels P1 and P2 have bilaterally symmetrical circuit structures having the reference line RLm as the center between the data lines DLn and DLn+1. The first and second pixels P1 and P2 share the first scan line SLk1 and the second scan line SLK2 extended in the horizontal direction in parallel with each other.

The first and second pixels P1 and P2 respectively include OLEDs and pixel circuits for independently driving the OLED. Each of the pixel circuits includes first and second switching TFTs ST1 and ST2, a driving TFT DT, and a storage capacitor Cst.

Each pixel circuit is connected to the first and second scan lines SLk1 and SLk2 that respectively control the first and second switching TFTs ST1 and ST2, a data line DLn or DLn+1 through which a data signal data[n] or data[n+1] is supplied to the first switching TFT ST1, the reference line RLm through which a reference signal ref[m] is supplied to the second switching TFT ST2 and characteristics of the driving TFT DT are output from the second switching TFT ST2, a first power line PL1 through which high level power EL VDD is supplied to the driving TFT DT, and a second power line PL2 through which a low level power EL VSS is supplied to a cathode of an OLED.

Each pixel circuit is driven in a display mode for displaying data through the OLED and a sensing mode for sensing characteristics of the driving TFTs DT of the pixels P1 and P2. The sensing mode may be performed during a test process before shipment of products, or performed between display modes as necessary.

Specifically, the OLED is serially connected to the driving TFT DT between the first power line PL1 and the second power line PL2. The OLED includes an anode connected to the driving TFT DT, a cathode connected to the second power line PL2 and an emission layer formed between the anode and the cathode. The emission layer includes an electron injection layer, an electron transport layer, an organic emission layer, a hole transport layer, and a hole injection layer, which are sequentially laminated between the cathode and the anode. When a positive bias is applied across the anode and the cathode of the OLED, electrons from the cathode are supplied to the organic emission layer through the electron injection layer and the electron transport layer and holes from the anode are supplied to the organic emission layer through the hole injection layer and the hole transport layer. Accordingly, the supplied electrons and holes are recombined in the organic emission layer to emit fluorescent or phosphor substances, to thereby generate light in proportion to current.

The first switching TFT ST1 has a gate electrode connected to the first scan line SLk1, a first electrode connected to the data line DLn or DLn+1, and a second electrode commonly connected to the gate electrode of the driving TFT DT and the first electrode of the storage capacitor Cst. The first electrode and the second electrode of the first switching TFT ST1 become a source electrode and a drain electrode according to a current direction. The first switching TFT ST1 supplies the data signal data[n] or data[n+1] of the data line DLn or DLn+1 to a first node N1 in response to a first scan signal SS1 of the first scan line SLk1 in the sensing mode and the display mode.

The second switching TFT ST2 has a gate electrode connected to the second scan line SLk2, a first electrode connected to the reference line RLm, and a second electrode connected to a second node N2 to which the first electrode of the driving TFT DT, the second electrode of the storage capacitor Cst and the anode of the OLED are commonly connected. The first electrode and the second electrode of the second switching TFT ST2 become a source electrode and a drain electrode according to a current direction. The second switching TFT ST2 supplies the reference signal ref[m] of the reference line RLm to the second node N2 in response to a second scan signal SS2 of the second scan line SLk2 in the sensing mode and the display mode. The second switching TFT ST2 is used as an output path between the driving TFT DT and the reference line RLm in the sensing mode.

The storage capacitor Cst is connected between the first node N1 and the second node N2 of the driving TFT DT. The storage capacitor Cst charges a difference between voltages of the data signal data[n] or data[n+1] and the reference signal ref[m] respectively supplied to the first node N1 and the second node N2 and provides the charged voltage as a driving voltage Vgs of the driving TFT DT in the sensing mode and the display mode.

The driving TFT DT has the gate electrode connected to the first node N1, the first electrode connected to the second node N2, and the second electrode connected to the high level power line PL1. The first electrode and the second electrode of the driving TFT DT become a source electrode and a drain electrode according to a current direction. The driving TFT DT provides current in proportion to the driving voltage Vgs supplied from the storage capacitor Cst to the OLED through the second node N2 such that the OLED emits light in the display mode. The driving TFT DT provides current in proportion to the driving voltage Vgs supplied from the storage capacitor Cst to the second node N2 in the sensing mode. The current supplied to the second node N2 is output through the second switching TFT ST2 and the reference line RLm.

The first and second pixels P1 and P2 are driven in the display mode and the sensing mode. The first and second pixels P1 and P2 display luminances corresponding to the data signals data[n] and data[n+1] supplied thereto through the data lines DLn and DLn+1, respectively, in the display mode. The first and second pixels P1 and P2 are driven in a time division manner through the data lines DLn and DLn+1 to sequentially output pixel currents that respectively represent characteristics of the driving TFTs DT of the first and second pixels P1 and P2 through the reference line RLm shared by the first and second pixels P1 and P2 in the sensing mode.

As described above, the first and second pixels P1 and P2 that represent pixel strings share the reference line RLm in the OLED display device according to the first embodiment of the present invention, and thus the number of reference lines RLm in a pixel array area is reduced to half the number of data lines, which corresponds to the number of pixel strings. Accordingly, it is possible to increase aperture ratios of the first and second pixels P1 and P2 compared to the conventional OLED display device in which the number of reference lines equals the number of data lines in the pixel array area. Furthermore, since the number of reference channels of the data driver, which are respectively connected to the reference lines RLm, is also reduced to half the number of data lines, the size or number of data driver ICs can be decreased.

Figure 2:
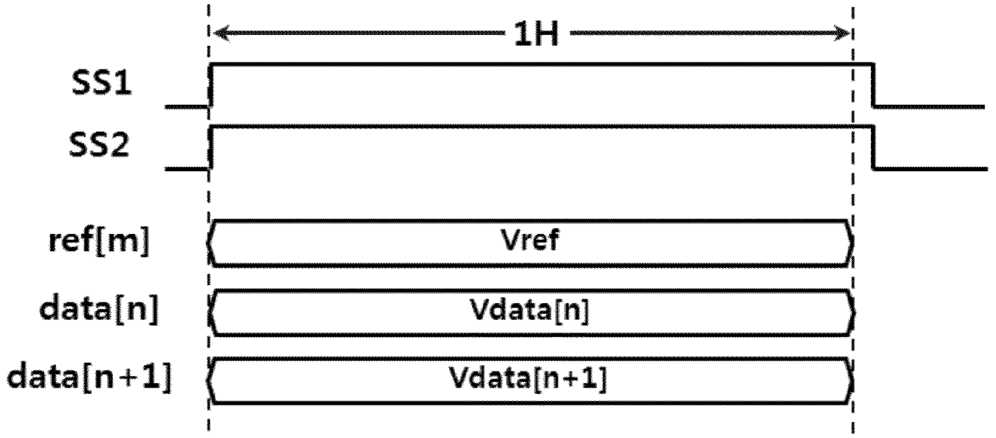
FIG. 2 shows driving waveforms of the pixels shown in FIG. 1 in a display mode.

FIG. 2 shows driving waveforms of the first and second pixels P1 and P2 shown in FIG. 1 in the display mode.

Referring to FIG. 2, a gate on voltage is simultaneously supplied to the first and second scan lines SLk1 and SLk2 through the first and second scan signals SS1 and SS2 from first and second scan drivers, respectively, in a corresponding horizontal period 1H of the display mode. Data voltages Vdata[n] and Vdata[n+1] are respectively supplied to the data lines DLn and DLn+1 through the data signals data[n] and data[n+1] from the data driver. A reference voltage Vref is supplied to the reference line RLm through the reference signal ref[m] from the data driver. Accordingly, the first and second switching TFTs ST1 and ST2 of the first and second pixels P1 and P2 are turned on by the gate on voltage of the first and scan signals SS1 and SS2, and the storage capacitors Cst of the first and second pixels P1 and P2 respectively charge differences between the data voltages Vdata[n] and Vdata[n+1], respectively supplied to the first node N1 and the second node N2 through the first and second switching TFTs ST1 and ST2, and the reference voltage Vref, that is, driving voltages Vgs corresponding to the data voltages Vdata[n] and Vdata[n+1]. Here, OLED driving current can be prevented from varying due to line resistance of the power lines PL1 and PL2 because the specific reference voltage Vref is provided to the second node N2.

In the remaining horizontal period of the display mode, the first and second switching TFTs ST1 and ST2 of each of the first and second pixels P1 and P2 are simultaneously turned off by a gate off voltage of the first and second scan signals SS1 and SS2, and the driving TFT DT supplies current in proportion to the driving voltage Vgs charged in the storage capacitor Cst to the OLED such that the OLED emits light.

Figure 3A:
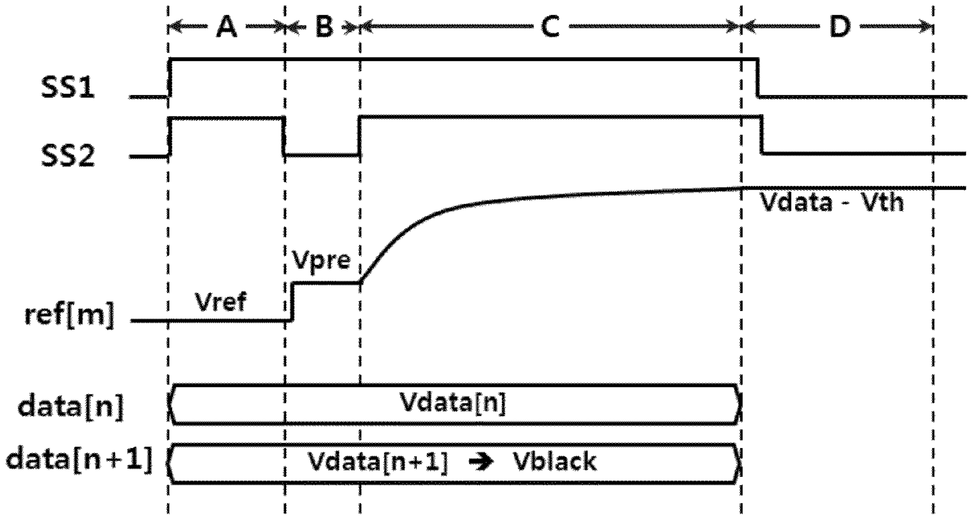
FIGS. 3A and 3B show driving waveforms of the pixels shown in FIG. 1 in a sensing mode.
Figure 3B:
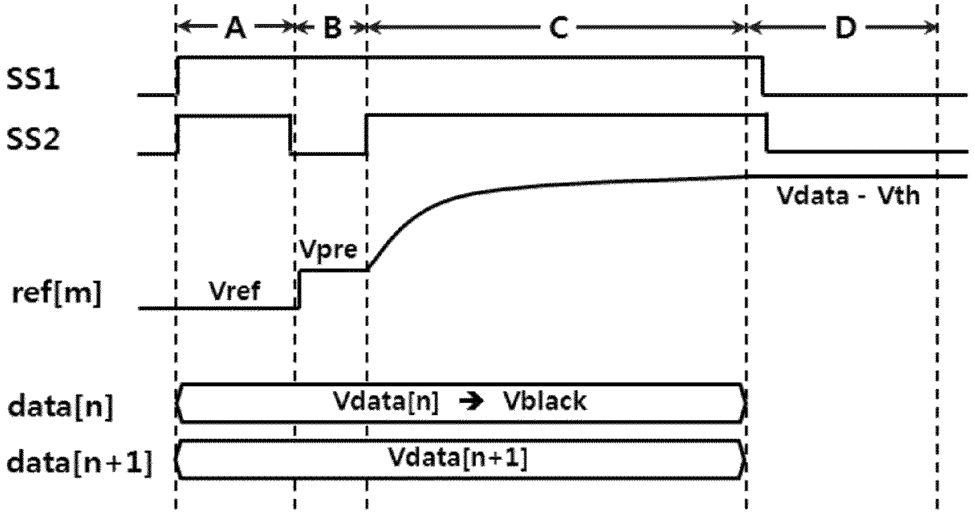

FIGS. 3A and 3B show driving waveforms the first and second pixels P1 and P2 shown in FIG. 1 in the sensing mode.

In the sensing mode, the first and second pixels P1 and P2 are respectively driven in a time division manner through the data lines DLn and DLn+1 to sequentially sense pixel currents, which represent characteristics of the driving TFTs DT of the first and second pixels P1 and P2, as voltages through the reference line RLm shared by the first and second pixels P1 and P2. The sensing period for the first and second pixels P1 and P2 is time-divided into a first sensing period for sensing the pixel current of the first pixel P1, as shown in FIG. 3A, and a second sensing period for sensing the pixel current of the second pixel P2, as shown in FIG. 3B.

In the first sensing period shown in FIG. 3A, the data voltage Vdata[n] for sensing is supplied through the data signal data[n] to the first pixel P1 via the data line DLn to drive the driving TFT DT of the first pixel P1 and the pixel current that represents characteristics of the driving TFT DT of the first pixel P1 is sensed as a voltage through the reference line RLm, whereas a black data voltage Vblack corresponding to a minimum data voltage (0V) is provided through the data signal data[n+1] to the second pixel P2 via the data line DLn+1 to turn off the driving TFT DT of the second pixel P2 so as to prevent the driving TFT DT from operating. Here, an off voltage capable of preventing the driving TFT DT from operating can be supplied to the data line DLn+1, instead of the black data voltage Vblack.

In the second sensing period shown in FIG. 3B, the data voltage Vdata[n+1] for sensing is supplied through the data signal data[n+1] to the second pixel P2 via the data line DLn+1 to drive the driving TFT DT of the second pixel P2 and the pixel current that represents characteristics of the driving TFT DT of the second pixel P2 is sensed as a voltage through the reference line RLm, whereas the black data voltage Vblack or off voltage is provided through the data signal data[n] to the first pixel P1 via the data line DLn to turn off the driving TFT DT of the first pixel P1 so as to prevent the driving TFT DT from operating.

Specifically, each of the first and second sensing periods shown in FIGS. 3A and 3B includes an initialization period A, a precharge period B, a discharge period C, and a sampling period D.

In the initialization period A of the first sensing period shown in FIG. 3A, the gate on voltage is supplied through the first and second scan signals SS1 and SS2 to the first and seconds scan lines SLk1 and SLk2 from the first and second scan drivers, the data voltage Vdata[n] for sensing is provided through the data signal data[n] to the data line DLn from the data driver, the black data voltage Vblack is supplied through the data signal data[n+1] to the data line DLn+1 from the data driver, and the reference voltage Vref is provided through the reference signal ref[m] to the reference line RLm from the data driver.

Accordingly, the first and second nodes N1 and N2 of the first pixel P1 are respectively initialized to the data voltage Vdata[n] for sensing and the reference voltage Vref through the first and second switching TFTs ST1 and ST2, and the storage capacitor Cst charges a voltage (Vdata[n]−Vref>Vth) higher than a threshold voltage Vth of the driving TFT DT to drive the driving TFT DT.

The first and second nodes N1 and N2 of the second pixel P2 are respectively initialized to the black data voltage Vblack and the reference voltage Vref through the first and second switching TFTs ST1 and ST2, and the storage capacitor Cst charges a voltage (Vblack−Vref<Vth) lower than the threshold voltage Vth of the driving TFT DT to turn the driving TFT DT off.

In the precharge period B of the first sensing period shown in FIG. 3A, the same driving waveforms as those applied in the initialization period A are supplied, except that the gate off voltage is supplied through the second scan signal SS2 to the second scan line SLk2 from the second scan driver and a precharge voltage Vpre is provided to the reference line RLm from the data driver.

Accordingly, the reference line RLm is precharged to the precharge voltage Vpre higher than the reference voltage Vref when the second switching TFT ST2 is turned off. The precharge voltage Vpre of the reference line RLm is appropriately controlled according to sensing conditions such as a sensing range of the data driver, data voltage, characteristics of the driving TFT, etc.

In the discharge period C of the first sensing period shown in FIG. 3A, the same driving waveforms as those applied in the previous precharge period B are supplied, except that the gate on voltage is supplied through the second scan signal SS2 to the second scan line SLk2 from the scan driver, and the precharge voltage Vpre supplied to the reference line RLm from the data driver is blocked.

Accordingly, the pixel current of the driving TFT DT of the first pixel P1 is output via the turned on second switching TFT ST2 and the reference line RLm and the voltage of the reference line RLm increases from the precharge voltage Vpre in proportion to the pixel current of the driving TFT DT of the first pixel P1. When the driving voltage Vgs of the storage capacitor Cst reaches the threshold voltage Vth of the driving TFT DT as the voltage of the reference line RLm increases, the voltage of the reference line RLm saturates at a voltage corresponding to the difference between the data voltage Vdata[n] and the threshold voltage Vth of the driving TFT DT.

In the sampling period D of the first sensing period shown in FIG. 3A, the data driver samples the saturated voltage Vdata−Vth of the reference line RLm and outputs the sampled voltage as a sensing voltage Vsensing, to thereby sense a voltage in proportion to the pixel current of the driving TFT DT of the first pixel P1. Here, the gate off voltage Voff is supplied through the first and second scan signals SS1 and SS2 to the first and second scan lines SLk1 and SLk2, and output of the data signals data[n] and data[n+1] to the data lines DLn and DLn+1 from the data driver and output of the reference signal ref[m] to the reference line RLm are blocked.

As described above, the threshold voltage Vth that represents the characteristics of the driving TFT DT can be detected using the sensing voltage Vsensing sampled on the reference line RLm in the sampling period D, that is, the sampled saturated voltage Vdata−Vth of the reference line RLm, and mobility that represents the characteristics of the driving TFT DT can be sensed (detected) using a function of obtaining the current of the driving TFT DT.

In the second sensing period shown in FIG. 3B, the same driving waveforms as those applied in the first sensing period shown in FIG. 3A are supplied, except that the black data voltage Vblack or off voltage is supplied from the data driver through the data signal data[n] to the data line DLn and the sensing data voltage Vdata[n+1] is supplied from the data driver through the data signal data[n+1] to the data line DLn+1 during the initialization period A to the discharge period C.

In the second sensing period, the driving TFT DT of the second pixel P2 is driven by the data voltage Vdata[n+1] for sensing, and the saturated voltage Vdata−Vth that represents the characteristics of the driving TFT DT of the second pixel P2 is sampled and output as the sensing voltage Vsensing in the same manner as that of the first sensing period. Here, the driving TFT DT of the first pixel P1 is turned off by the black data voltage Vblack or off voltage, and thus the driving TFT DT does not operate.

As described above, the OLED display device according to the first embodiment of the present invention can sense, as voltages, the pixel currents representing the characteristics of the driving TFTs DT of the first and second pixels P1 and P2, which are sequentially output through the reference line shared by the first and second pixels P1 and P2 by driving the first and second pixels P1 and P2 in a time division manner through the data lines DLn and DLn+1 in a corresponding horizontal period of the sensing mode. Accordingly, the number of reference lines RLm can be reduced to half the number of data lines DLn and DLn+1 and the number of reference channels of the data driver can also be decreased to half the number of data lines DLn and DLn+1.

Figure 4:
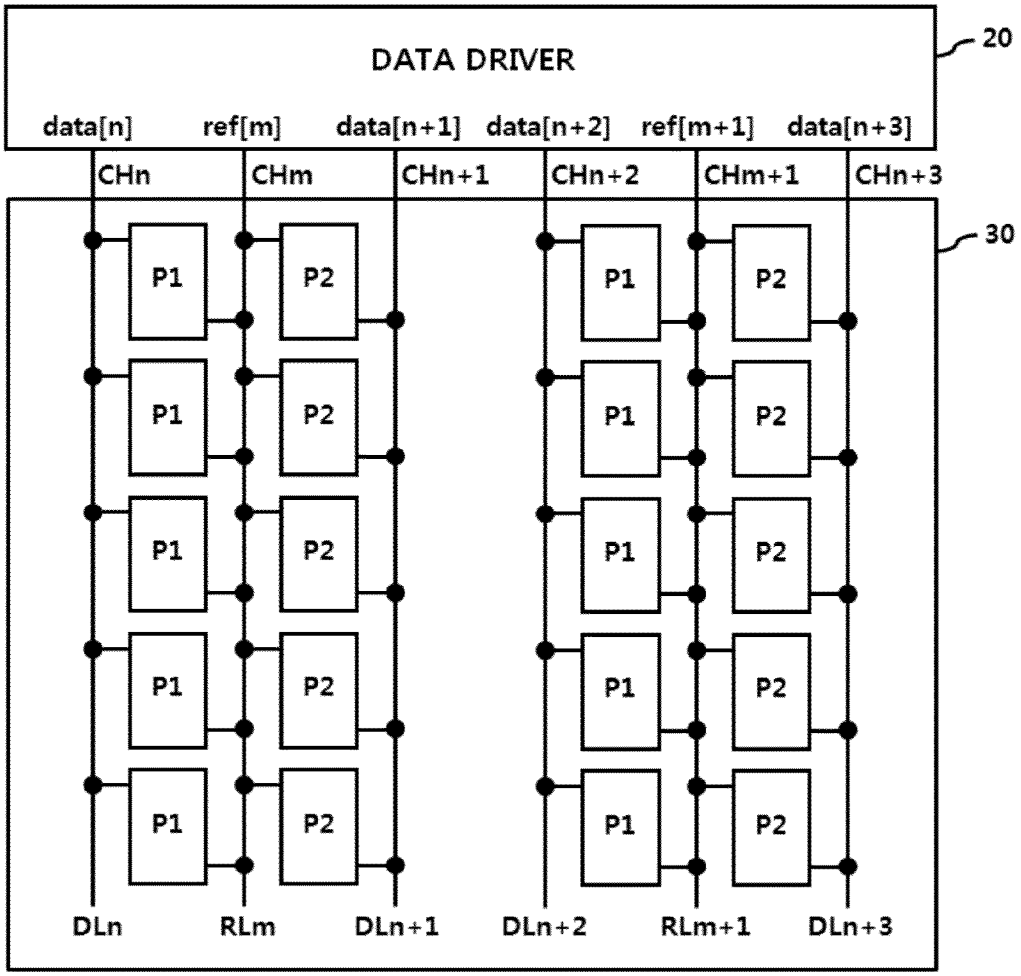
FIG. 4 is a block diagram of an OLED display device for sensing pixel current, which includes the pixel structure shown in FIG. 1, according to the first embodiment of the present invention.

FIG. 4 is a block diagram of the OLED display device including the two pixels P1 and P2, shown in FIG. 1.

The OLED display device shown in FIG. 4 includes a display panel 30 and a data driver 20 that drives data lines DLn to DLn+3 and reference lines RLm and RLm+1 of the display panel 30, senses pixel currents of the pixels P1 and P2 through the reference lines RLm and RLm+1 and outputs the sensed pixel currents.

In addition, the OLED display device includes the first and second scan drivers for driving the first scan lines SLk1 and the second scan lines SLk2, shown in FIG. 1, and a timing controller for controlling the data driver 20 and the first and second scan drivers.

The first and second pixels P1 and P2, shown in FIG. 1, are repeatedly arranged in horizontal and vertical directions in the pixel array area of the display panel 30. A first pixel string including a plurality of first pixels P1 and a second pixel string including a plurality of second pixels P2 are respectively connected to the neighboring data lines DLn and DLn+1 between the data lines DLn and DLn+1 and share the reference line RLm located between the first and second pixel strings. A third pixel string including a plurality of first pixels P1 and a fourth pixel string including a plurality of second pixels P2 are respectively connected to the neighboring data lines DLn+2 and DLn+3 between the data lines DLn+2 and DLn+3 and share the reference line RLm+1 located between the third and fourth pixel strings.

The data lines DLn to DLn+3 are respectively connected to data channels CHn to CHn+3 of the data driver 20. The reference lines RLm and RLm+1 are respectively connected to reference channels CHm and CHm+1 of the data driver 20.

In the display mode and the sensing mode, the data driver 20 converts input data from the timing controller into analog data signals data[n] to data[n+3] and respectively supplies the analog data signals data[n] to data[n+3] to the data lines DLn to DLn+3. In addition, the data driver 20 converts input reference data into reference signals ref[m] and ref[m+1] and respectively supplies the reference signals ref[m] and ref[m+1] to the reference lines RLm and RLm+1 of the display panel 30. The data driver 20 provides the external precharge voltage Vpre to the reference lines RLm and RLm+1 in the sensing mode.

In each horizontal period of the sensing mode, the data driver 20 drives the first and second pixels P1 and P2 in a time division manner through the data lines DLn and DLn+1, drives the first and second pixels P1 and P2 in a time division manner through the data lines DLn+2 and DLn+3, senses, as voltages, the pixel currents of the first and second pixels P1 and P2, which are sequentially output through the reference line RLm, and the pixel currents of the first and second pixels P1 and P2, which are sequentially output through the reference line RLm+1, and outputs the sensed pixel currents.

As described above, in the OLED display device according to the first embodiment of the present invention, the aperture ratios of the first and second pixels P1 and P2 in the pixel array area increase because the first and second pixels P1 and P2, that is, two pixel strings share one reference line RLm or RLm+1 and thus the number of reference lines RLm and RLm+1 is reduced to half the number of data lines DLn to DLn+3. Furthermore, since the number of reference channels CHm and CHm+1 of the data driver 20, which are connected to the reference lines RLm and RLm+1, is reduced to half the number of data lines, the size and number of data driver ICs decrease.

Figure 5:
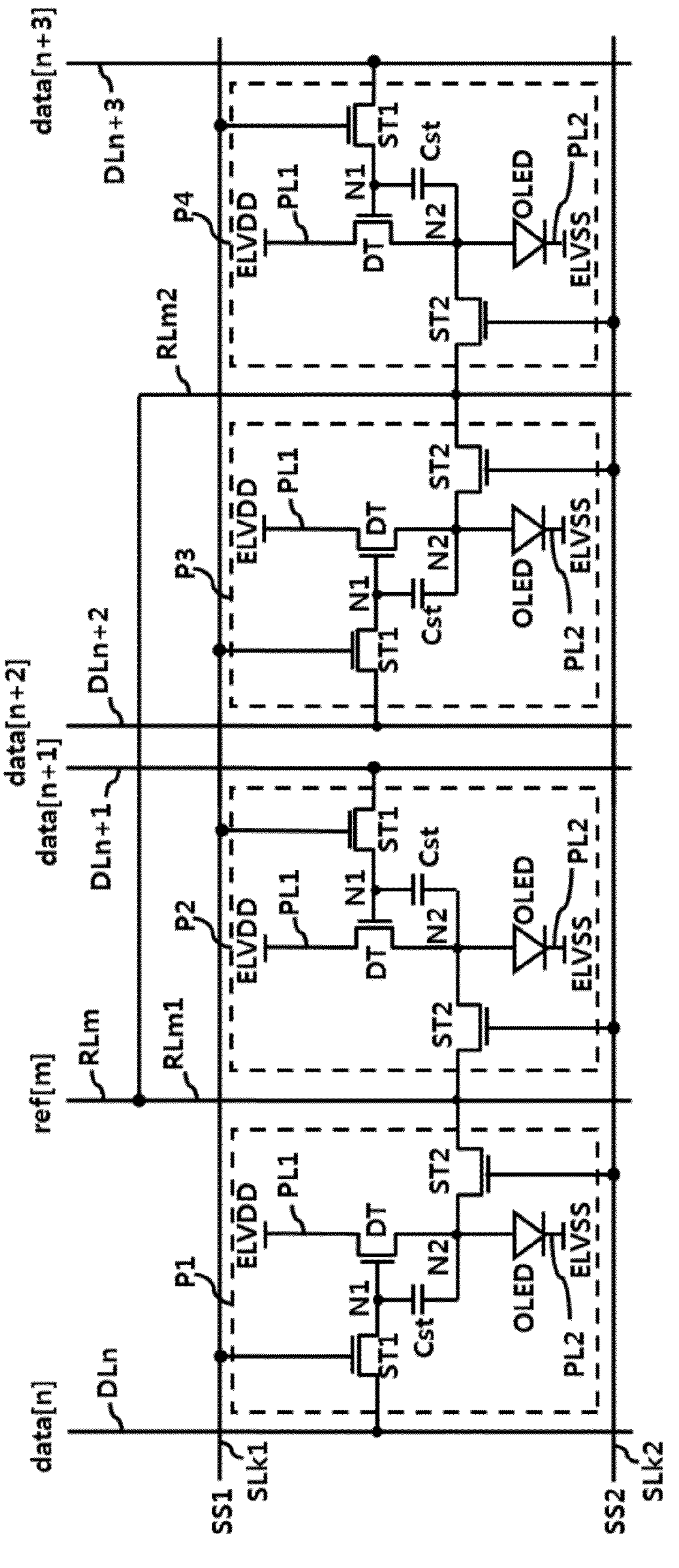
FIG. 5 is an equivalent circuit diagram of four typical pixels of an OLED display device for sensing pixel current according to a second embodiment of the present invention.

FIG. 5 is an equivalent circuit diagram of four typical pixels of an OLED display device for sensing pixel current according to a second embodiment of the present invention.

The second embodiment shown in FIG. 5 has the same concept as the first embodiment shown in FIG. 1 and is distinguished from the first embodiment in that each reference line RLm is branched to at least two lines such that four neighboring pixels P1 to P4 in the horizontal direction share one reference line RLm. Accordingly, explanation of components equal to the corresponding components shown in FIG. 1 is omitted or simplified.

In FIG. 5, first to fourth pixels P1 to P4 arranged in the horizontal direction respectively represent pixel strings. The first to fourth pixels P1 to P4 are respectively connected to four data lines DLn to DLn+3 extended in the vertical direction and commonly connected to first and second scan lines SLk1 and SLk2 extended in the horizontal direction. The reference line RLm is branched to a first branch reference line RLm1 located between the first and second pixels P1 and P2 and commonly connected to the first and second pixels P1 and P2 and a second branch reference line RLm2 located between the third and fourth pixels P3 and P4 and commonly connected to the third and fourth pixels P3 and P4. The first and second pixels P1 and P2 have bilaterally symmetrical structures having the first branch reference line RLm1 shared thereby as the center and the third and fourth pixels P3 and P4 have bilaterally symmetrical structures having the second branch reference line RLm2 shared thereby as the center.

The first and second branch reference lines RLm1 and RLm2 are commonly connected to the reference line RLm (or reference pad) and connected to one reference channel of the data driver through the reference line RLm. Accordingly, the number of reference channels of the driver can be reduced to half the number of reference channels in the first embodiment, that is, to a quarter of the number of data lines DLn and DLn+1, which corresponds to the number of pixel strings.

In the display mode, the first to fourth pixels P1 to P4 display luminances corresponding to data signals data[n] to data[n+3] respectively provided through the data lines DLn to DLn+3. In the sensing mode, the first to fourth pixels P1 to P4 are driven in a time division manner through the data lines DLn to DLn+3 to sequentially output pixel currents of the first to fourth pixels P1 to P4 through the reference line RLm shared by the first to fourth pixels P1 to P4.

As described above, the second embodiment shown in FIG. 5 can reduce the number of first and second branch reference lines RLm1 and RLm2 arranged in the pixel array area to half the number of data lines DLn and DLn1, which corresponds to the number of pixel strings. Particularly, the second embodiment shown in FIG. 2 can reduce the number of reference channels of the data driver to a quarter of the number of data lines because the two branch reference lines RLm1 and RLm2 share the same reference channel through the reference line RLm. Accordingly, it is possible to reduce the size or number of data driver ICs to smaller than that of the first embodiment.

Figure 6:
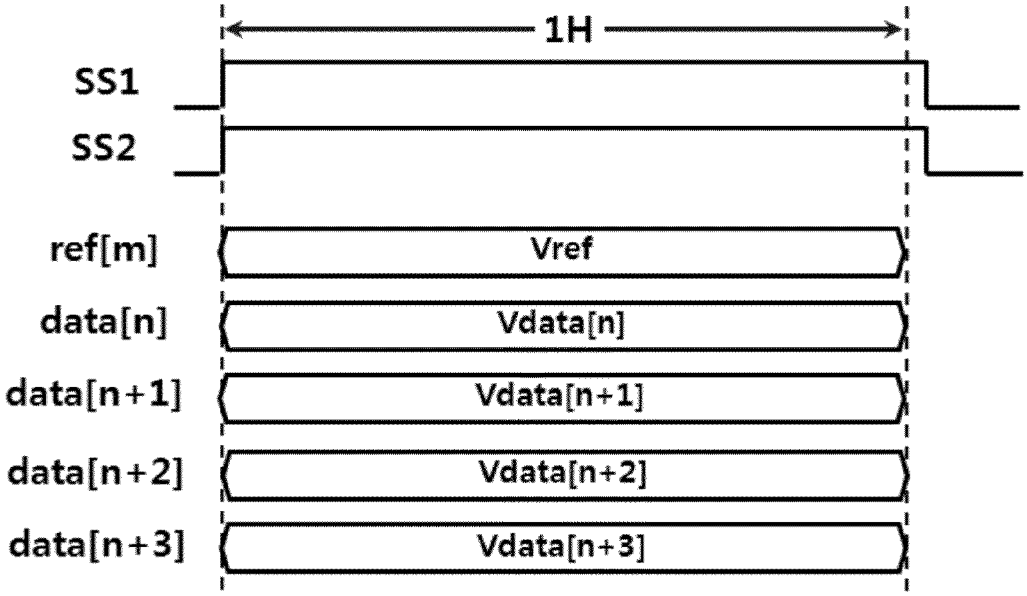
FIG. 6 shows driving waveforms of the pixels shown in FIG. 5 in a display mode.

FIG. 6 shows driving waveforms of the first to fourth pixels P1 to P4 shown in FIG. 5 in the display mode.

In the second embodiment shown in FIG. 6, waveforms of the data signals data[n+2] and data[n+3] respectively applied to the data lines DLn+2 and DLn+3 respectively connected to the third and fourth pixels P3 and P4 are added to the waveforms of the display mode according to the first embodiment shown in FIG. 2. In the display mode, the first to fourth pixels P1 to P4 make the OLEDs corresponding thereto emit light with the driving voltages Vgs respectively corresponding to the data signals data[n] to data[n+3] supplied through the data lines DLn to DLn+3 to respectively display luminances corresponding to the data signals data[n] to data[n+3].

Figure 7A:
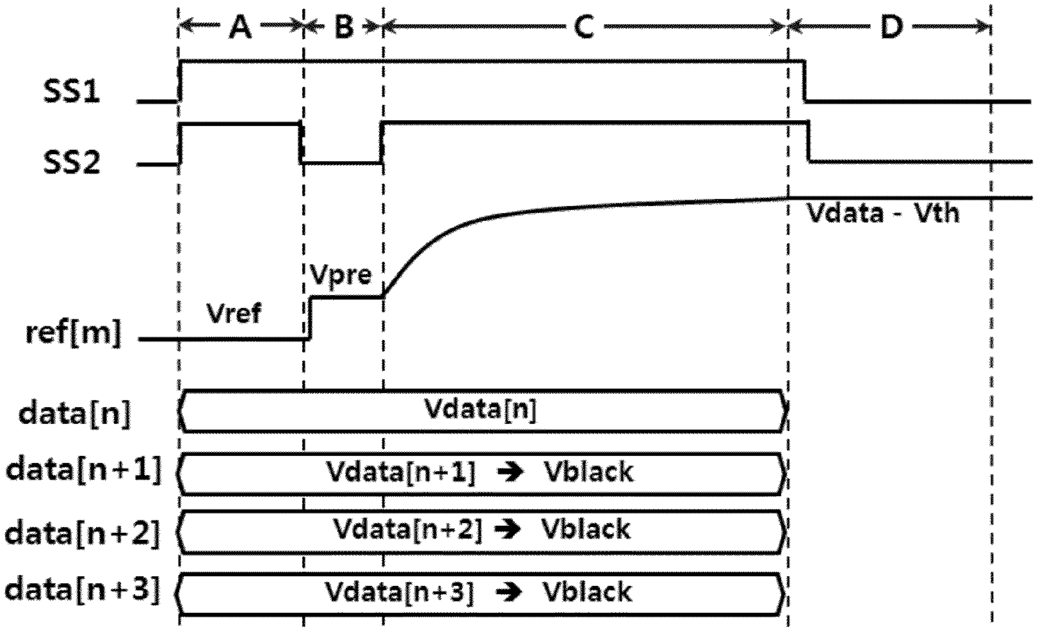
FIGS. 7A and 7D show driving waveforms of the pixels shown in FIG. 5 in a sensing mode.
Figure 7B:
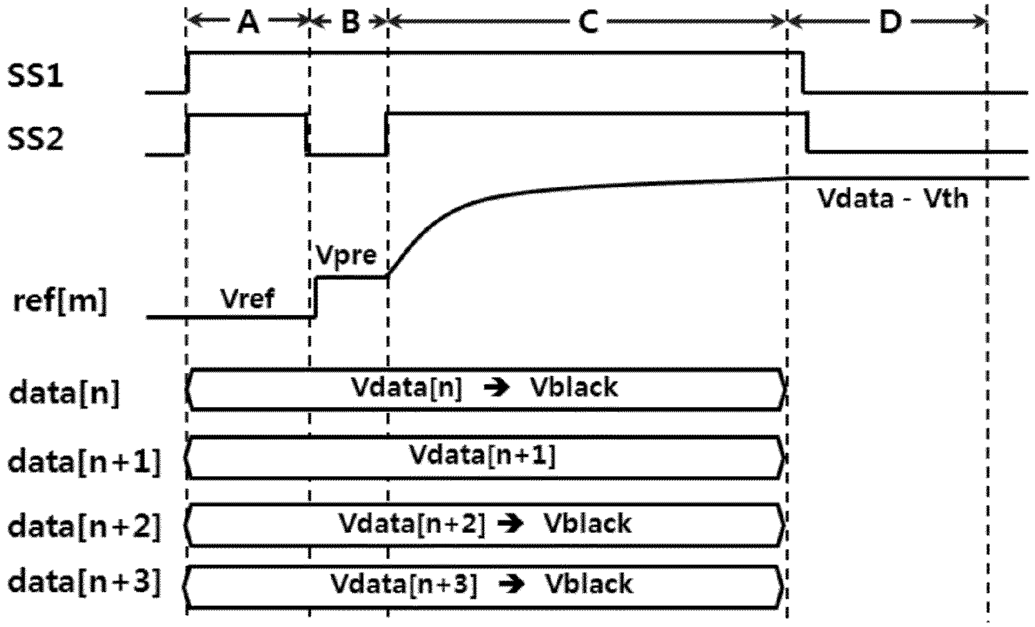
Figure 7C:
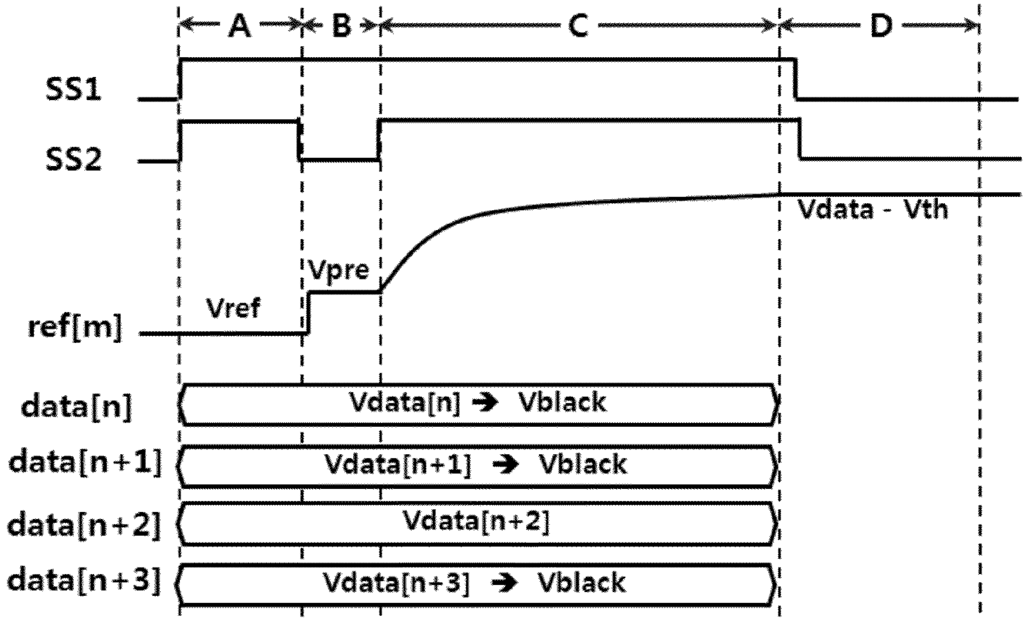
Figure 7D:
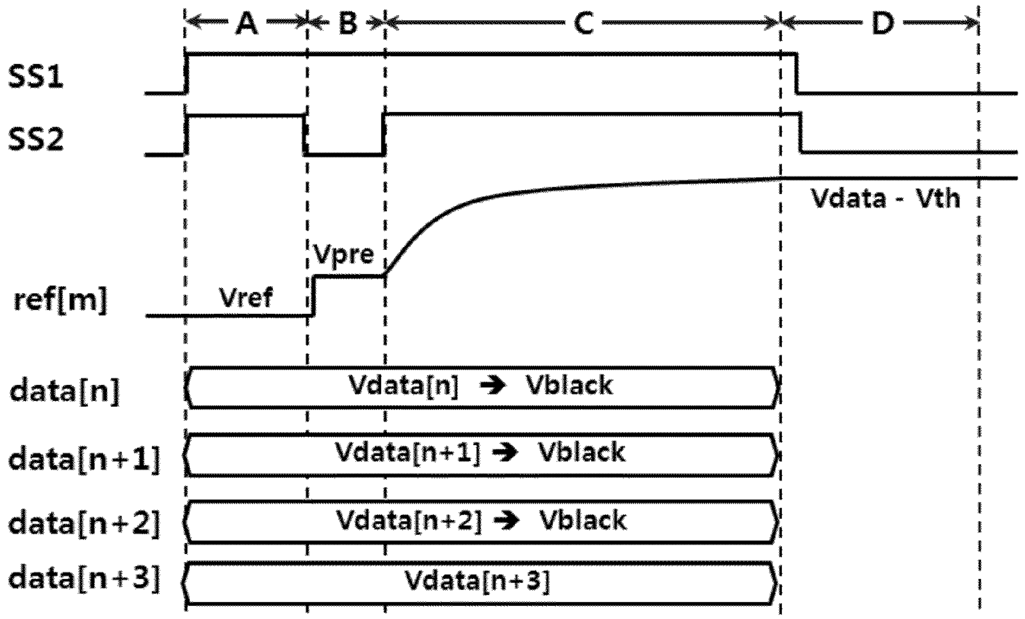

FIGS. 7A and 7D show driving waveforms of the first to fourth pixels P1 to P4 shown in FIG. 5 in the sensing mode.

In the second embodiment shown in FIGS. 7A to 7D, the waveforms of the data signals data[n+2] and data[n+3] applied to the data lines DLn+2 and DLn+3 respectively connected to the third and fourth pixels P3 and P4 are added to the waveforms of the display mode according to the first embodiment shown in FIGS. 3A and 3B.

In a corresponding horizontal period of the display mode, the first to fourth pixels P1 to P4 are driven in a time division manner to sequentially sense pixel currents of driving TFTs DT of the first to fourth pixels P1 to P4 through the reference line RLm (reference channel) shared by the first to fourth pixels P1 to P4. In other words, each horizontal period of the sensing mode is time-divided into first to fourth sensing periods for sensing characteristics of the first to fourth pixels P1 to P4, as shown in FIGS. 7A to 7D. Each of the first to fourth sensing periods shown in FIGS. 7A to 7D includes the initialization period A, precharge period B, discharge period C and sampling period D as in the embodiment shown in FIGS. 3A and 3B.

In the first sensing period of each horizontal period shown in FIG. 7A, the data voltage Vdata[n] for sensing is supplied to the first pixel P1 through the data line DLn to drive the driving TFT DT of the first pixel P1 and the pixel current of the driving TFT DT of the first pixel P1 is sensed as a voltage through the first branch reference line RLm1 and the reference line RLm. The black data voltage Vblack (or off voltage) is supplied to the remaining data lines DLn+1 to DLn+3 to turn off the driving TFTs DT of the second, third and fourth pixels P2, P3 and P4.

In the second sensing period of each horizontal period shown in FIG. 7B, the data voltage Vdata[n+1] for sensing is supplied to the second pixel P2 through the data line DLn+1 to drive the driving TFT DT of the second pixel P2 and the pixel current of the driving TFT DT of the second pixel P2 is sensed as a voltage through the first branch reference line RLm1 and the reference line RLm. The black data voltage Vblack (or off voltage) is supplied to the other data lines DLn, DLn+2 and DLn+3 to turn off the driving TFTs DT of the first, third and fourth pixels P1, P3 and P4.

In the third sensing period of each horizontal period shown in FIG. 7C, the data voltage Vdata[n+2] for sensing is supplied to the third pixel P3 through the data line DLn+2 to drive the driving TFT DT of the third pixel P3 and the pixel current of the driving TFT DT of the third pixel P3 is sensed as a voltage through the second branch reference line RLm2 and the reference line RLm. The black data voltage Vblack (or off voltage) is supplied to the other data lines DLn, DLn+1 and DLn+3 to turn off the driving TFTs DT of the first, second and fourth pixels P1, P2 and P4.

In the fourth sensing period of each horizontal period shown in FIG. 7D, the data voltage Vdata[n+3] for sensing is supplied to the fourth pixel P4 through the data line DLn+3 to drive the driving TFT DT of the fourth pixel P4 and the pixel current of the driving TFT DT of the fourth pixel P4 is sensed as a voltage through the second branch reference line RLm2 and the reference line RLm. The black data voltage Vblack (or off voltage) is supplied to the other data lines DLn, DLn+1 and DLn+2 to turn off the driving TFTs DT of the first, second and third pixels P1, P2 and P3.

As described above, the OLED display device according to the second embodiment of the present invention drives the four pixels P1 to P4 arranged in the horizontal direction in a time division manner through the data lines DLn to DLn+3 to sequentially sense pixel currents of the driving TFTs DT of the first to fourth pixels P1 to P4 through the shared reference line RLm (that is, reference channel). Accordingly, it is possible to reduce the number of first and second branch reference lines RLm1 and RLm2 to half the number of data lines, which corresponds to the number of pixel strings, in the pixel array area and decrease the number of reference channels of the data driver, which are connected to the reference line RLm, to a quarter of the number of data lines.

Figure 8:
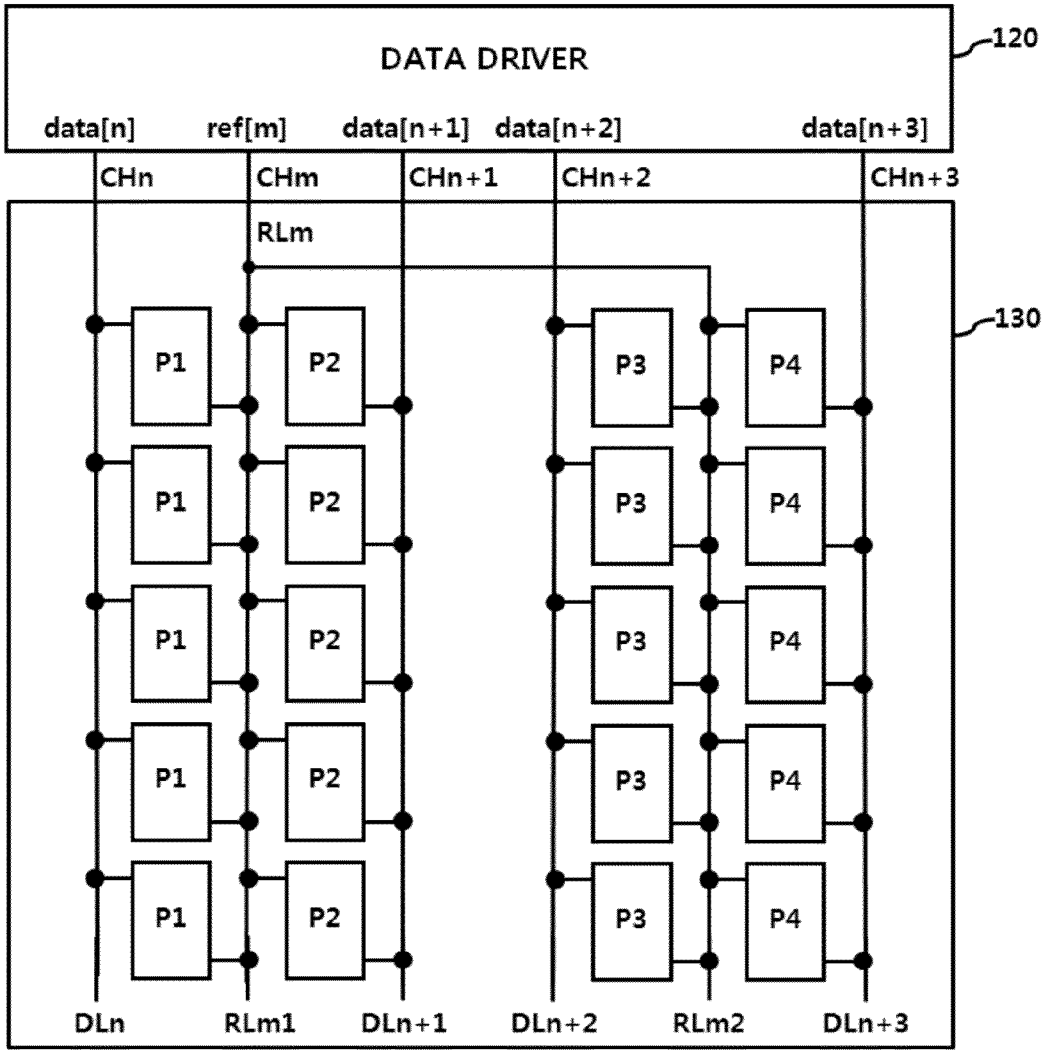
FIG. 8 is a block diagram of an OLED display device for sensing pixel current, which includes the pixel structure shown in FIG. 5, according to the second embodiment of the present invention.

FIG. 8 is a block diagram of the OLED display device including the first to fourth pixels P1 to P4 according to the second embodiment of the present invention, shown in FIG. 5.

The OLED display device according to the second embodiment of the invention shown in FIG. 8 is distinguished from the OLED display device according to the first embodiment shown in FIG. 4 in that each reference line RLm is branched to at least two lines and thus at least four neighboring pixel strings in the horizontal direction share one reference line RLm and one reference channel CHm.

Referring to FIG. 8, the first to fourth pixels P1 to P4 according to the second embodiment shown in FIG. 5 are repeatedly arranged in the vertical direction and the horizontal direction in the pixel array area of the display panel 130. The first pixel string composed of a plurality of first pixels P1 and the second pixel string composed of a plurality of second pixels P2 are respectively connected to the two neighboring data lines DLn and DLn+1 between the data lines DLn and DLn+1. The third pixel string composed of a plurality of third pixels P3 and the fourth pixel string composed of a plurality of fourth pixels P4 are respectively connected to the neighboring two data lines DLn+2 and DLn+3 between the data lines DLn+2 and DLn+3.

The reference line RLm is branched to the at least first and second branch reference lines RLm1 and RLm2. The first branch reference line RLm1 is located between the first and second pixel strings and commonly connected to the first and second pixel strings. The second branch reference line RLm2 is located between the third and fourth pixel strings and commonly connected to the third and fourth pixel strings.

The data lines DLn to DLn+3 are respectively connected to the data channels CHn to CHn+3 of the data driver 120. The reference line RLm (reference pad) shared by the first and second branch reference lines RLm1 and RLm2 is individually connected to the reference channel CHm of the data driver 120.

The data driver 120 drives the first to fourth pixels P1 to P4 in a time division manner through the data lines DLn to DLn+3 in each horizontal period of the sensing mode and senses, as voltages, the pixel currents of the first to fourth pixels P1 to P4, which are sequentially output through the reference line RLm (reference pad) shared by the first and second branch reference lines RLm1 and RLm2 and the reference channel CHm.

Accordingly, in the OLED display device according to the second embodiment of the present invention, two pixel strings share a branch reference line (RLm1 or RLm2) in the pixel array area, and thus the number of branch reference lines RLm1 and RLm2 is reduced to half the number of data lines DLn to DLn+3 and the aperture ratios of the pixels P1 to P4 increase in the pixel array area. Particularly, since the two branch reference lines RLm1 and RLm2 share the reference channel CHm through the reference line RLm (reference pad), the number of reference channels CHm of the data driver 120 can be reduced to a quarter of the number of data lines DLn to DLn+3 so as to decrease the size or number of data driver ICs, compared to the first embodiment.

While the reference line RLm (reference pad) individually connected to the reference channel CHm of the data driver 120 is branched to the first and second branch reference lines RLm1 and RLm2 in the second embodiment, the present invention is not limited thereto and each reference line RLm (reference pad) can be branched to N (N being a natural number) branch reference lines RLm1 to RLmN. That is, each reference channel CHm of the data driver is commonly connected to 2N pixel strings through N branch reference lines.

For example, six pixel strings share one reference channel if three branch reference lines are commonly connected to each reference channel, and eight pixel strings share one reference channel if four branch reference lines are commonly connected to each reference channel. However, the number of pixel strings that share each reference channel is preferably smaller than 8 (N being smaller than 4) because reference line load increase as the number of pixel strings that share each reference channel increases, lengthening sensing time.

The data driver can sequentially sense pixel currents of 2N pixels through each reference channel by driving the 2N pixels sharing each reference channel in a time division manner through 2N data lines in each horizontal period of the sensing mode. The data driver can select a pixel to be sensed from the 2N pixels sharing each reference channel by applying a data voltage for sensing to the pixel to be sensed through the data line corresponding to the pixel and de-select the other pixels by applying the black data voltage (or off voltage) to the other pixels through the data lines corresponding to the other pixels, to thereby sense the current of the selected pixel through the shared reference channel. The data driver can repeat this sensing operation 2N times to sequentially sense the pixel currents of the 2N pixels through the shared reference channel.

Figure 9:
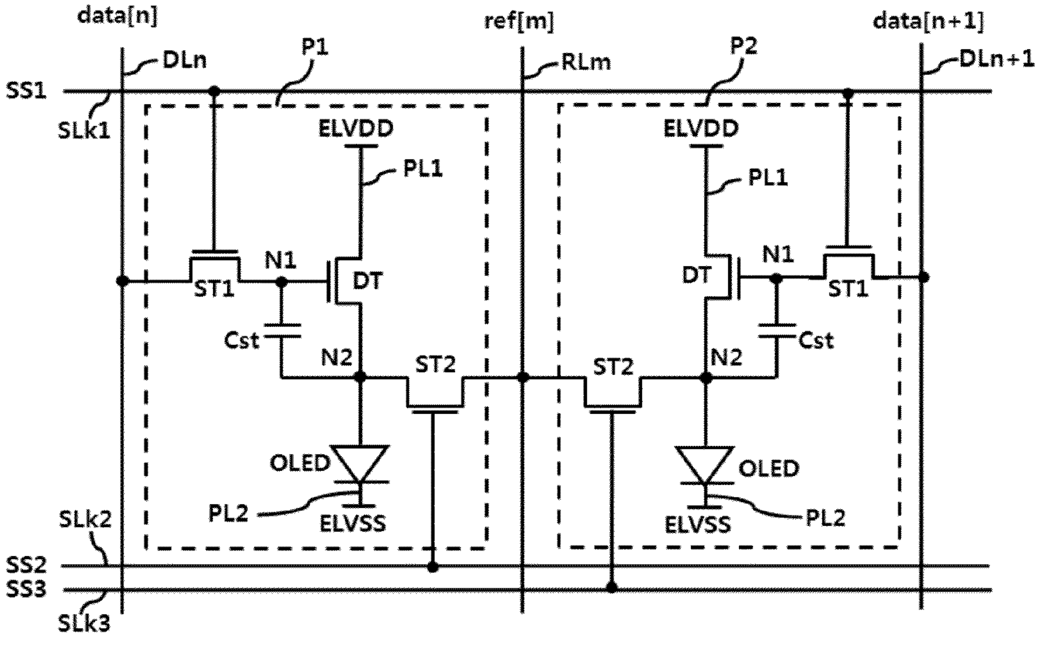
FIG. 9 is an equivalent circuit diagram of two typical pixels of an OLED display device for sensing pixel current according to a third embodiment of the present invention.

FIG. 9 is an equivalent circuit diagram of two typical pixels of an OLED display device for sensing pixel current according to a third embodiment of the present invention.

The third embodiment shown in FIG. 9 has the same concept as the first embodiment shown in FIG. 1 and is distinguished from the first embodiment in that the second switching TFTs ST2 of the first and second pixels P1 and P2 are respectively connected to the second and third scan lines SLk2 and SLk3. Accordingly, explanation of components equal to the corresponding components shown in FIG. 1 is omitted or simplified.

Referring to FIG. 9, the first switching TFTs ST1 of the first and second pixels P1 and P2 are commonly connected to the first scan line SLk1, the second switching TFT ST2 of the first pixel P1 is connected to the second scan line SLk2, and the second switching TFT ST2 of the second pixel P2 is connected to the third scan line SLk2. Accordingly, the second switching TFT ST2 of the first pixel P1 can be driven through the second scan line SLk2 to form a current path with the reference line RLm or the second switching TFT ST2 of the second pixel P2 can be driven through the third scan line SLk3 to form a current path with the reference line RLm in the sensing mode. Therefore, only a pixel to be sensed from the pixels P1 and P2 sharing the reference line RLm is connected to the reference line RLm and the other pixel is electrically separated from the reference line RLm. Here, while the sensing data voltage can be applied only to the pixel to be sensed and the black data voltage (or off voltage) can be applied to the other pixel, the sensing data voltage may be applied to both pixels.

The first, second and third scan lines SLk1 to SLk3 are respectively driven by first, second and third scan drivers.

Figure 10:
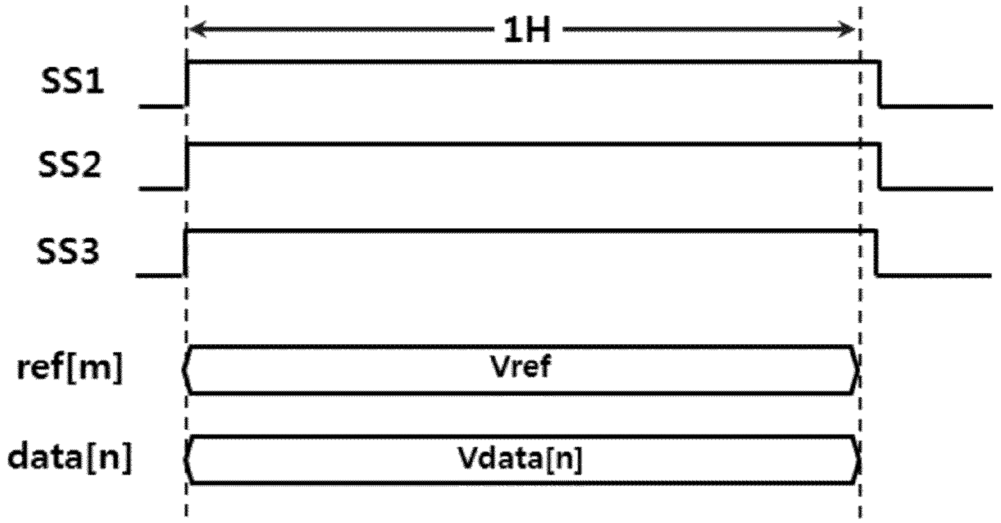
FIG. 10 shows driving waveforms of the pixels shown in FIG. 9 in a display mode.

FIG. 10 shows driving waveforms of the first and second pixels P1 and P2 shown in FIG. 9 in the display mode.

The driving waveforms of the display mode correspond to the driving waveforms of the display mode according to the first embodiment shown in FIG. 2, except that a third scan signal SS3 corresponding to the first and second scan signals SS1 and SS2 is applied to the third scan line SLk3.

The first and second pixels P1 and P2 charge the driving voltages Vgs respectively corresponding to the data signals data[n] and data[n+1] respectively supplied through the data lines DLn and DLn+1 in the storage capacitors Cst thereof according to gate on voltages of the scan signals SS1, SS2 and SS3 simultaneously supplied through the first, second and third scan lines SLk1, SLk2 and SLk3 and respectively display luminances corresponding to the data signals data[n] and data[n+1] by making the OLEDs thereof emit light using the charged driving voltages Vgs.

Figure 11A:
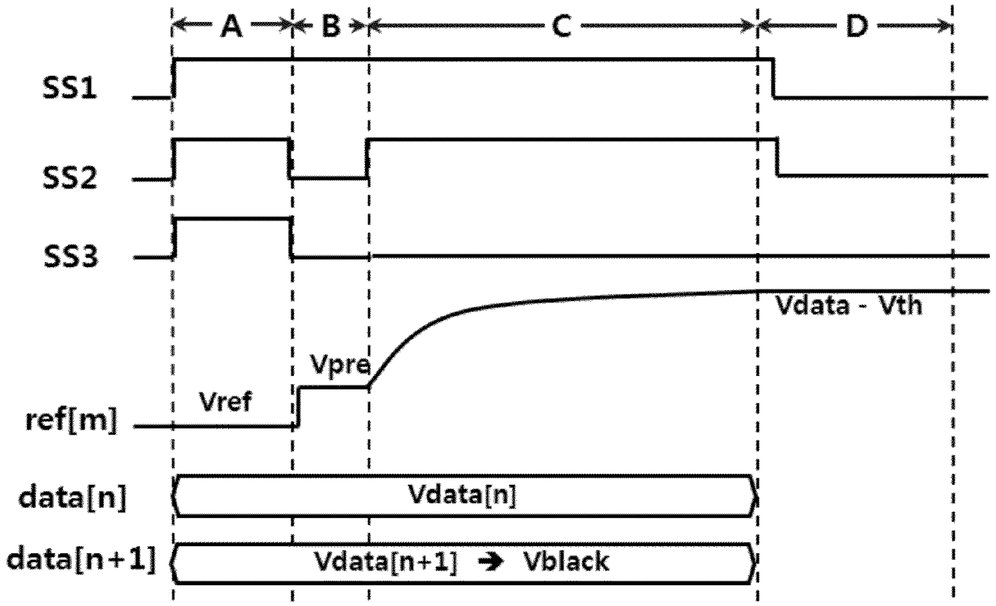
FIGS. 11A and 11B show driving waveforms of the pixels shown in FIG. 9 in a sensing mode.
Figure 11B:
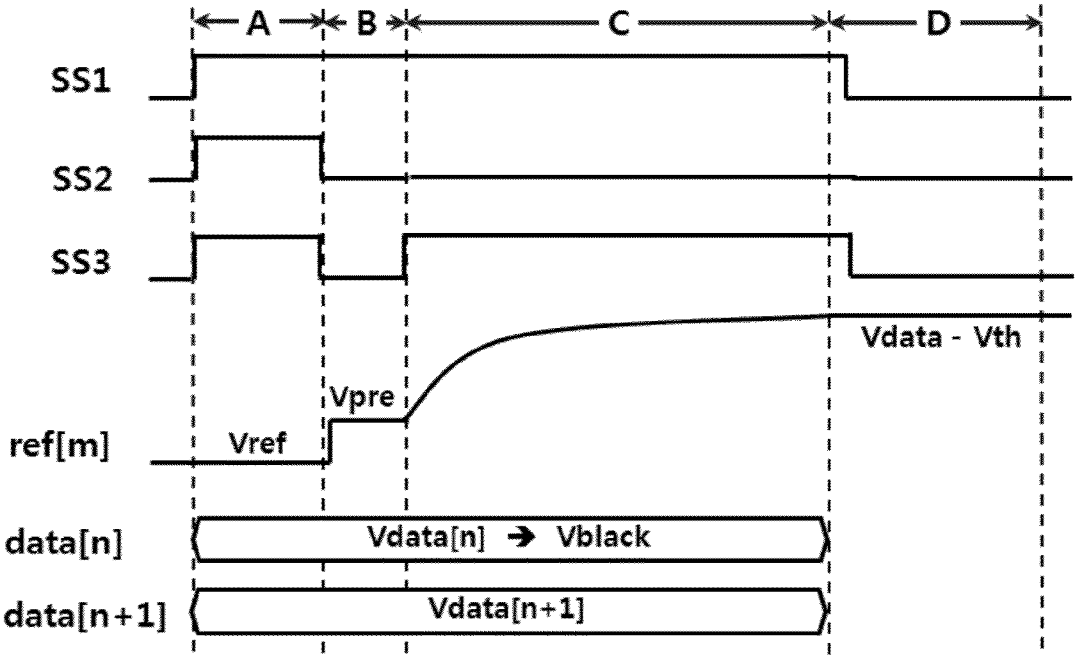

FIGS. 11A and 11B show driving waveforms of the first and pixels shown in FIG. 9 in the sensing mode.

The driving waveforms of the display mode shown in FIGS. 11A and 11B correspond to the driving waveforms of the display mode according to the first embodiment shown in FIGS. 3A and 3B, except that the third scan signal SS3 is supplied through the third scan line SLk3 and the second and third scan signals SS2 and SS3 alternately supply a gate on voltage and a gate off voltage in the discharge period.

In the first sensing period of each horizontal period shown in FIG. 11A, the first scan signal SS1 supplies the gate on voltage to the first and second pixels P1 and P2 to turn on the first switching TFTs ST1 of the first and second pixels P1 and P2 from the initialization period A to the discharge period C and applies the gate off voltage to the first and second pixels P1 and P2 to turn the first switching TFTs ST1 off in the sampling period D. The second scan signal SS2 supplies the gate on voltage to the first pixels P1 to turn on the second switching TFT ST2 of the first pixel P1 from the initialization period A to the discharge period C and applies the gate off voltage to the first pixel P1 to turn the second switching TFT ST2 off in the precharge period B and the sampling period D. The third scan signal SS3 supplies the gate on voltage to the second pixels P2 to turn on the second switching TFT ST2 of the second pixel P2 only during the initialization period A and applies the gate off voltage to the second pixel P2 to turn the second switching TFT ST2 off from the precharge period B to the sampling period D. The sensing data voltage Vdata[n] and the black data voltage Vblack (or off voltage) are respectively supplied through the data lines DLn and DLn+1 to the first and second pixels P1 and P2 from the initialization period A to the discharge period C, and the data voltages are not supplied during the sampling period D because the data lines DLn and DLn+1 are floated.

Accordingly, the driving TFT DT of the first pixel P1 is driven by the sensing data voltage Vdata[n] and the second switching TFT ST2 thereof is turned off according to the second scan signal SS2 in the first sensing period, and thus the pixel current of the driving TFT DT of the first pixel P1 is sensed as a voltage through the reference line RLm. Here, the driving TFT DT of the second pixel P2 is turned off according to the black data voltage Vblack (or off voltage) and the second switching TFT ST2 thereof is turned off according to the third scan signal SS3, and thus the second pixel P2 is not connected to the reference line RLm.

The second sensing period of each horizontal period, shown in FIG. 11B, is distinguished from the first sensing period, shown in FIG. 11A, in that the second scan signal SS2 supplies the gate off voltage to the second switching TFT ST2 of the first pixel P1 and the third scan signal SS3 applies the gate on voltage to the second switching TFT ST2 of the second pixel P2 in the discharge period C, and the black data voltage Vblack and the sensing data voltage Vdata[n] are respectively supplied through the data lines DLn and DLn+1 to the first and second pixels P1 and P2 from the initialization period A to the discharge period C.

Accordingly, the driving TFT DT of the second pixel P2 is driven by the sensing data voltage Vdata[n] and the second switching TFT ST2 thereof is turned off according to the third scan signal SS3 in the second sensing period, and thus the pixel current of the driving TFT DT of the second pixel P2 is sensed as a voltage through the reference line RLm. Here, the driving TFT DT of the first pixel P1 is turned off according to the black data voltage Vblack (or off voltage) and the second switching TFT ST2 thereof is turned off according to the second scan signal SS2, and thus the first pixel P1 is not connected to the reference line RLm.

As described above, the OLED display device according to the third embodiment of the present invention sequentially outputs the pixel currents of the driving TFTs DT of the first and second pixels P1 and P2 through the reference line RLm by driving the first and second pixels P1 and P2 sharing the reference line RLm in a time division manner through the data lines DLn and DLn+1 in a corresponding horizontal period of the sensing mode.

Figure 12:
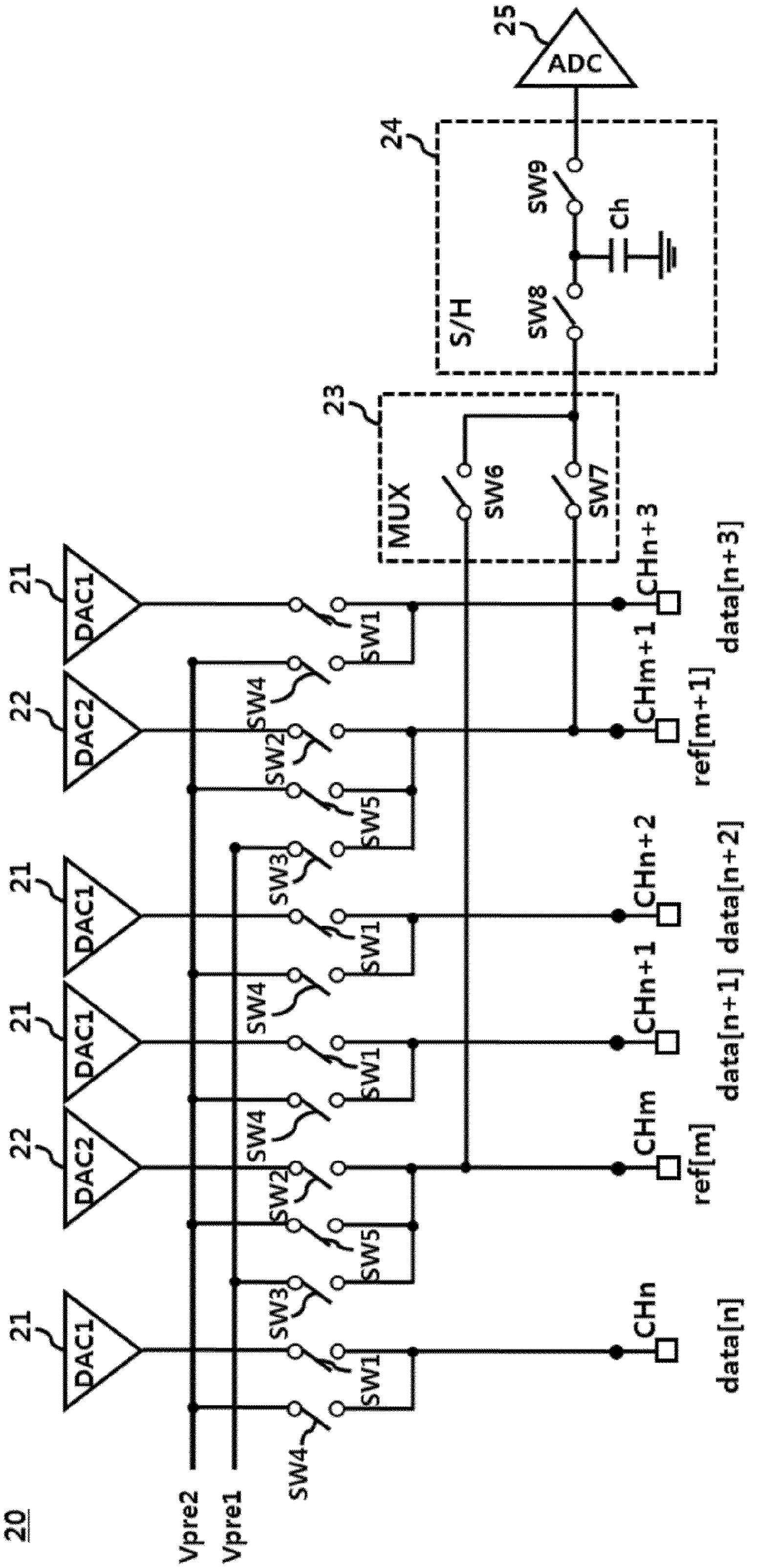
FIG. 12 is an equivalent circuit diagram illustrating an internal configuration of a data driver shown in FIG. 4 according to the first embodiment of the present invention.

FIG. 12 is an equivalent circuit diagram illustrating an internal configuration of the data driver 20 shown in FIG. 4 according to the first embodiment of the present invention.

The data driver 20 shown in FIG. 12 includes a first digital-to-analog converter (referred to as DAC1 hereinafter) 21 connected to the data channels CHn to CHn+3 through a first switch SW1, a DAC2 22 connected to the reference channels CHm and CHm+1 through a second switch SW2, a multiplexer (referred to as MUX hereinafter) 23 connected to the reference channels CHm and Chm+1, a sample and hold unit (referred to as S/H unit hereinafter) 24 connected to the MUX 23, and an analog-to-digital converter (referred to as ADC hereinafter) 25 connected to the S/H unit 24.

In addition, the data driver 20 includes a third switch SW3 connected between a supply line of a first precharge voltage vpre1 for the sensing mode and the reference channels CHm and CHm+1, a fourth switch SW4 connected between a supply line of a second precharge voltage vpre2 for the sensing mode and the data channels CHn and CHn+1, and a fifth switch SW5 connected between the supply line of the second precharge voltage vpre2 for the sensing mode and the reference channels CHm and CHm+1.

Furthermore, the data driver 20 further includes a latch for sequentially latching input data from the timing controller and, when data corresponding to one horizontal line is latched, simultaneously outputting the latched data to the DAC1 21 and DAC2 22, a shift register for sequentially outputting a sampling signal for controlling latch timing of the latch, and a plurality of output buffers respectively connected to the output ports of the DAC1 21 and the DAC2 22 or the output ports of the switches SW1 and SW2 to buffer the data signals data[n] to data[n+3] from the DAC1 21 and DAC2 22 and reference signals ref[m] and ref[m+1] and output the buffered data signals and reference signals.

The DAC1 21 converts input data into analog data signals data[n] to data[n+3] and respectively supplies the analog data signals data[n] to data[n+3] to the data channels CHn to CHn+3 through the first switch SW1 in the display mode and the sensing mode. The analog data signals data[n] to data[n+3] supplied to the data channels CHn to CHn+3 are respectively applied to the data lines.

The DAC2 22 converts input data into the reference signals ref[m] and ref[m+1] and respectively supplies the reference signals ref[m] and ref[m+1] through the second switch SW2 in the display mode and the sensing mode. The reference signals ref[m] and ref[m+1] supplied to the reference channels CHm and CHm+1 are respectively applied to the reference lines.

The first switch SW1 and the second switch SW2 are turned on during a period in which the data signals data[n] to data[n+3] are output in the display mode, are turned on during a period in which the data signals data[n] to data[n+3] are output in the sensing mode, that is, from the initialization period A to the discharge period C, and are turned off during the remaining period including the sampling period D.

The third switch SW3 is turned on in the precharge period B of the sensing mode such that the first precharge voltage Vpre1 for the sensing mode is supplied to the reference lines through the reference channels CHm and CHm+1. The third switch SW3 performs a switching operation opposite to that of the second switch SW2.

In the meantime, it may be necessary to precharge the data lines and reference lines with the second precharge voltage Vref2 for the display mode in the display mode according to a driving method. In this case, the fourth switch SW4 and the fifth switch SW5 are turned on such that the second precharge voltage Vpre2 for the display mode is supplied to the data lines and reference lines through the data channels CHn to CHn+3 and the reference channels CHm and CHm+1. The fourth switch SW4 and the fifth switch SW5 perform switching operations opposite to that of the second switch SW2 in the display mode. The fourth switch SW4 and the fifth switch SW5 may be omitted.

The MUX 23 selectively connects the reference channels CHm and CHm+1 to the S/H unit 24 in the sensing mode. Accordingly, it is possible to reduce the number of S/H units 24 and the number of ADCs 25 to less than the number of reference channels CHm and CHm+1. The MUX 23 includes a selection switch SW6 connected between the reference channel CHm and the input port of the S/H unit 24 and a selection switch SW7 connected between the reference channel CHm+1 and the input port of the S/H unit 24. The selection switch SW6 is turned on when currents of pixels that share the reference channel CHm are sensed, whereas the selection switch SW7 is turned on when currents of pixels that share the reference channel CHm+1 are sensed. The selection switches SW6 and SW7 are alternately switched in the sampling period D of the sensing mode. The MUX 23 may be omitted.

The S/H unit 24 includes an input switch SW8 through which sensing voltages supplied from the reference channels CHm and CHm+1 through the MUX 23 are charged in a capacitor ch and an output switch SW9 through which the voltage held in the capacitor ch is output to the ADC 25.

In the sampling period D of the sensing mode, the input switch SW8 is turned on simultaneously with the selection switch SW6 or the selection switch SW7 of the MUX such that the sensing voltage supplied from the reference channel CHm through the selection switch SW6 is sampled and charged in the capacitor ch or the sensing voltage supplied from the reference channel CHm+1 through the selection switch SW7 is sampled and charged in the capacitor ch.

The output switch SW9 is turned on when the capacitor ch is charged with the sensing voltage in the sampling period D of the sensing mode to supply the voltage charged in the capacitor ch to the ADC 25.

The ADC 25 converts the sensing voltage supplied from the S/H unit 24 into digital sensing data and provides the digital sensing data to the timing controller (not shown).

Control signals for controlling the switches SW1 to SW9 included in the data driver 20 are generated inside the data driver 200 or in the timing controller and supplied.

The timing controller controls the data driver 20 and the first and scan drivers and supplies data to the data driver 20 in the sensing mode and the display mode. The timing controller detects a characteristic deviation of the driving TFT DT of each pixel due to the pixel current of the driving TFT DT using data of each pixel, sensed by the data driver 20 in the sensing mode, to perform data compensation. To achieve this, the timing controller includes a sensing unit and a compensation unit. The sensing unit and the compensation unit may be included in the timing controller or in other circuit components such as a driver IC.

The sensing unit detects a compensation value for compensating for threshold voltage and mobility deviations of the driving TFT DT of each pixel according to the pixel current of each pixel using a sensing voltage (Vsensing=Vdata−Vth) supplied as digital data from the data driver 20 and stores the compensation value in a memory in the sensing mode. In the display mode, the compensation unit compensates for input data using the compensation value stored in the sensing mode.

Since the sensing voltage Vsensing from the data driver 20 is proportional to the pixel current of the driving TFT DT of the corresponding pixel, the sensing unit calculates the pixel current of the driving TFT DT of the corresponding pixel using the sensing voltage Vsensing (I=Cload*(Vsensing−Vpre)/Δt, Cload being a reference line load, Δt being a time period from the start point of the sampling period to a sampling time). The sensing unit detects a threshold voltage representing characteristics of a driving TFT DT and a mobility deviation (mobility ratio of a corresponding pixel to a reference pixel) between pixels using a function of obtaining pixel current according to a threshold voltage and mobility, as described in U.S. Pat. No. 7,982,695, detects an offset value for compensating for the detected threshold voltage and a gain value for compensating for the mobility deviation as compensation values and stores the compensation values in the memory in the form of a look-up table.

In the display mode, the compensation unit compensates for input data using stored offset values and gain values for respective pixels. For example, the compensation unit compensates for the input data by multiplying the voltage of the input data by the gain values and adding the offset values to the voltage of the input data.

As described above, the OLED display device according to the present invention can sense pixel current of each pixel through the data driver easily and rapidly, and thus it is possible to compensate for characteristic deviation due to deterioration of driving TFTs of pixels by inserting a sensing mode between display modes in which the OLED display device is driven and sensing pixel currents of the pixels even after the OLED display device is put on the market as well as during a test process of the OLED display device.

The data driver 20 and the timing controller are equally applied to the second and third embodiments as well as the first embodiment. However, in the data driver 120 applied to the second embodiment, the number of reference channels and the numbers of DACs and switches connected to the reference channels are reduced to half those in the first embodiment.

Figure 13:
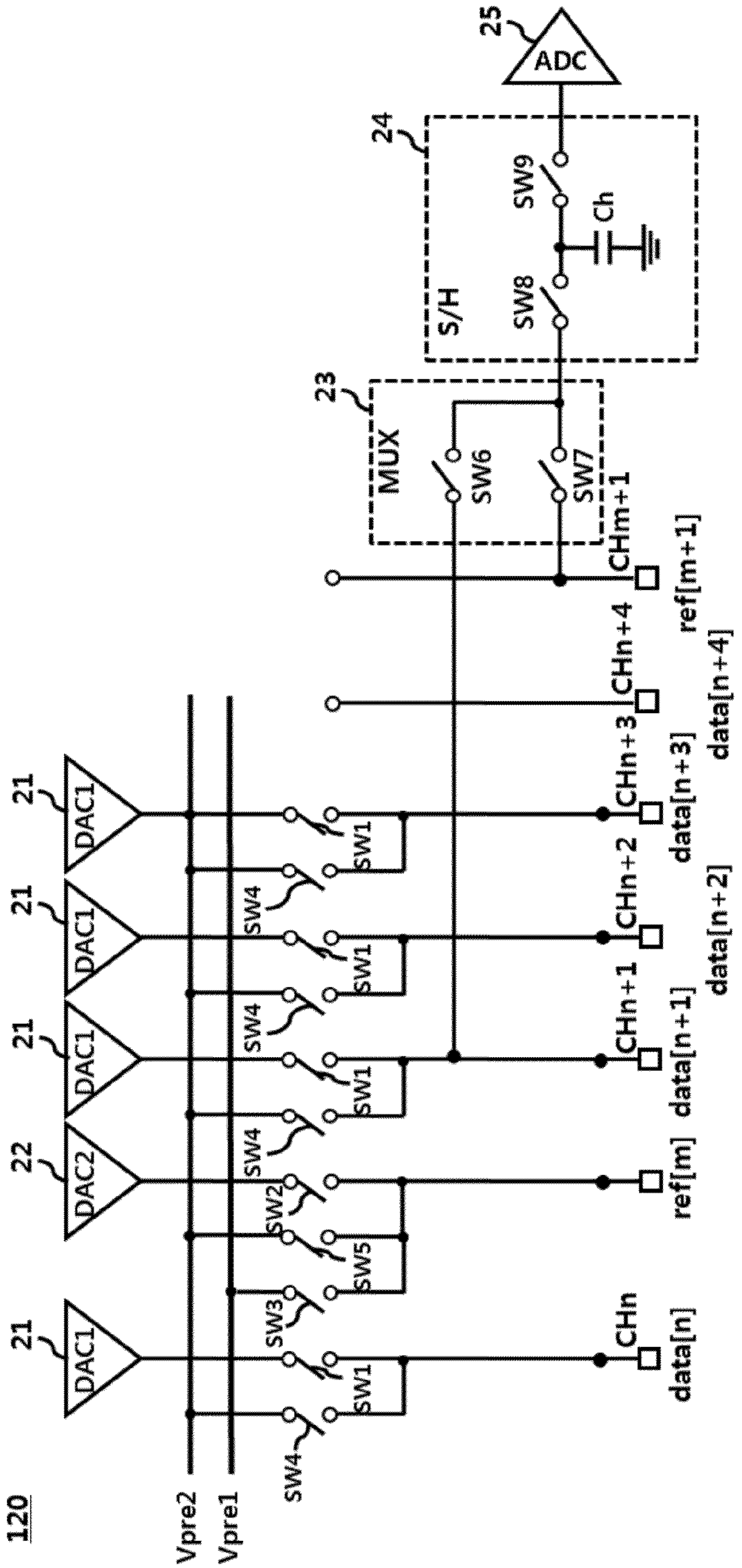
FIG. 13 is an equivalent circuit diagram illustrating an internal configuration of a data driver shown in FIG. 8 according to the second embodiment of the present invention.

FIG. 13 is an equivalent circuit diagram illustrating an internal configuration of the data driver 120 shown in FIG. 8 according to the second embodiment of the present invention.

The data driver 120 according to the second embodiment shown in FIG. 13 corresponds to the data driver according to the first embodiment shown in FIG. 12, except that the number of reference channels is reduced to half the number of reference channels in the first embodiment and the numbers of DAC2 and switches SW2, SW3 and SW5 are decreased, and thus explanation of components equal to the corresponding components of the first embodiment is omitted.

While the two data channels CHn+1 and CHn+2 are located between the two channels CHm and CHm+1 in the data driver 20 according to the first embodiment shown in FIG. 12, four data channels CHn+1 to CHn+4 are located between the reference channels CHm and CHm+1 in the data driver 120 according to the second embodiment shown in FIG. 13 because the number of reference channels is reduced.

As described above, according to the OLED display device for sensing pixel current and the pixel current sensing method thereof according to the embodiments of the present invention, 2N pixels consecutively arranged in the horizontal direction share a reference line and are driven in a time division manner through data lines in every horizontal period of the sensing mode to sequentially sense currents of the 2N pixels through the reference line and reference channel shared by the 2N pixels. Accordingly, the number of reference lines and the number of reference channels can be reduced to half the number of data lines. Therefore, a pixel aperture ratio can be increased due to a reduction in the number of reference lines, compared to the conventional OLED display device in which pixels do not share a reference line, and the size or number of data driver IDs can be reduced due to a decrease in the number of reference channels, compared to the conventional OLED display device.

Furthermore, the OLED display device for sensing pixel current and the pixel current sensing method thereof according to the embodiments of the present invention can rapidly sense pixel currents through the data driver with a simple configuration. Accordingly, the present invention can compensate for not only an initial characteristic deviation of driving TFTs of pixels but also a characteristic deviation due to deterioration of the driving TFTs by inserting a sensing mode between display modes in which the OLED display device is driven and sensing pixel currents of the pixels even after the OLED display device is put on the market as well as during a test process of the OLED display device, and thus the lifespan and picture quality of the OLED display device can be improved.

It is obvious to those skilled in the art that claims that are not explicitly cited in each other in the appended claims may be presented in combination as an exemplary embodiment of the present invention or included as a new claim by a subsequent amendment after the application is filed.

What is claimed is:

1. An organic light emitting diode (OLED) display device, comprising:

a display panel including 2N pixels that share a reference line though which a reference signal is supplied and are respectively connected to 2N data lines through which data signals are applied, N being a natural number; and a data driver configured to:

drive the 2N pixels sharing the reference line in a time division manner through the data lines;

sense currents of the time-division-driven 2N pixels as voltages through the shared reference line;

output the sensed currents, in a sensing mode;

divide a sensing period for the 2N pixels sharing the reference line into 2N time-division sensing periods; and in each of the 2N time-division sensing periods:

select a pixel to be sensed from the 2N pixels through a data line corresponding to the pixel to be sensed; and de-select the other pixel through a data line corresponding to the other pixel, wherein, in each time-division sensing period, the data driver is further configured to:

select the pixel to be sensed by supplying a data voltage for sensing to the data line corresponding to the pixel to be sensed to drive the pixel, and de-select the other pixel by supplying a black data voltage or an off voltage to the data line corresponding to the other pixel to prevent the other pixel from being driven, wherein each of the 2N pixels comprises:

a light-emitting element, a driving thin film transistor (TFT) for driving the light-emitting element, a first switching TFT for supplying a data signal of the corresponding data line to a first node connected to a gate electrode of the driving TFT in response to a scan signal of a scan line, a second switching TFT for supplying a reference signal of the reference line to a second node connected between the driving TFT and the light-emitting element in response to a different scan signal of a different scan line, and a storage capacitor for charging a voltage between the first and second nodes and providing the charged voltage as a driving voltage of the driving TFT, and wherein each of the time-division sensing periods includes:

an initialization period in which the first and second switching TFTs of each pixel are turned on such that the first and second nodes are respectively initialized to the data signal from the corresponding data line and the reference signal of the reference line, a precharge period in which only the second switching TFT is turned off and the reference line is precharged with a precharge voltage, a discharge period in which the first and second switching TFTs are turned on such that pixel current of the driving TFT flows to the reference line, and a sampling period in which the first and second switching TFTs are turned off and the pixel current of the driving TFT is sampled with a saturated voltage of the reference line and held.

2. The OLED display device according to claim 1, wherein the 2N pixels that share the reference line include two pixels that are located on both sides of the shared reference line between two neighboring data lines and respectively connected to the two data lines.

3. The OLED display device according to claim 2, wherein:

the first switching TFTs of the two pixels share a first scan line through which a first scan signal is supplied; and the second switching TFTs of the two pixels share a second scan line through which a second scan signal is supplied.

4. The OLED display device according to claim 2, wherein:

the first switching TFTs of the two pixels share a first scan line through which a first scan signal is supplied;

the second switching TFT of one of the two pixels is connected to a second scan line through which a second scan signal is supplied;

the second switching TFT of the other of the two pixels is connected to a third scan line through which a third scan signal is supplied; and the second scan signal and the third scan signal respectively provide voltages having opposite polarities only during the discharge period to form a current path between the driving TFT of a pixel to be sensed and the shared reference line and to open a current path between the driving TFT of the other pixel and the shared reference line.

5. The OLED display device according to claim 2, wherein:

the number of reference lines corresponds to half the number of data lines; and the number of reference channels respectively connected to the reference lines in the data driver corresponds to half the number of data lines.

6. The OLED display device according to claim 1, wherein:

the reference line is branched to N branch reference lines; and every two pixels from among the 2N pixels that share the reference line share the N branch reference lines, the two pixels being located on both sides of the shared branch reference lines between two neighboring data lines and respectively connected to the two data lines.

7. The OLED display device according to claim 6, wherein:

the number of branch reference lines corresponds to half the number of data lines; and the number of reference channels respectively connected to the reference lines in the data driver corresponds to half the number of data lines.

8. The OLED display device according to claim 1, wherein the data driver comprises:

a first digital-to-analog converter (DAC) configured to:

convert input data into the data signal; and output the data signal to a data channel individually connected to the data line;

a second DAC configured to:

convert input reference data into the reference signal; and output the reference signal to a reference channel individually connected to the reference line;

a sample and hold unit configured to:

sample the voltage of the reference line through the reference channel, hold the sampled voltage as a sensing voltage; and output the held sensing voltage;

an analog-to-digital converter (ADC) configured to:

convert the sensing voltage from the sample and hold unit into digital data; and output the digital data;

a first switch through which output of the first DAC is supplied to the data channel during the initialization period to the discharge period;

a second switch through which output of the second DAC is supplied to the reference channel during the initialization period and the discharge period; and a third switch through which the precharge voltage is supplied to the reference channel, wherein the first, second, and third switches are turned off during the sampling period.

9. The OLED display device according to claim 8, wherein:

the data driver further comprises a multiplexer connected between the reference channel and the sample and hold unit and configured to selectively connect at least two reference channels to an input channel of the sample and hold unit; and the number of sample and hold units and the number of ADCs correspond to the number of output channels of the multiplexer.

10. A method of sensing pixel current of an OLED display device which includes 2N (N being a natural number) pixels that share a reference line though which a reference signal is supplied and are respectively connected to 2N data lines through which data signals are applied, the method comprising:

driving the 2N pixels sharing the reference line in a time division manner through the data lines in a sensing mode; and sensing currents of the time-division-driven 2N pixels as voltages through the shared reference line and outputting the sensed currents, wherein the driving of the 2N pixels in a time division manner comprises:

dividing a sensing period for the 2N pixels into 2N time-division sensing periods, selecting a pixel to be sensed from the 2N pixels through a data line corresponding to the pixel, and de-selecting the other pixel through a data line corresponding to the other pixel in each of the 2N time-division sensing periods, wherein each of the 2N pixels comprises:

a light-emitting element, a driving TFT for driving the light-emitting element, a first switching TFT for supplying the data signal of the corresponding data line to a first node connected to the gate electrode of the driving TFT in response to a scan signal of a scan line, a second switching TFT for supplying a reference signal of the reference line to a second node connected between the driving TFT and the light-emitting element in response to a different scan signal of a different scan line, and a storage capacitor for charging a voltage between the first and second nodes and providing the charged voltage as a driving voltage of the driving TFT, and wherein each of the time division sensing periods includes:

an initialization period in which the first and second switching TFTs of each pixel are turned on such that the first and second nodes are respectively initialized to the data signal from the corresponding data line and the reference signal of the reference line, a precharge period in which only the second switching TFT is turned off and the reference lines is precharged with a precharge voltage, a discharge period in which the first and second switching TFTs are turned on such that pixel current of the driving TFT flows to the reference line, and a sampling period in which the first and second switching TFTs are turned off and the pixel current of the driving TFT is sampled with a saturated voltage of the reference line and held.

11. The method according to claim 10, wherein:

the 2N pixels that share the reference line include two pixels that are located on both sides of the shared reference line between two neighboring data lines and respectively connected to the two data lines;

the first switching TFTs of the two pixels are turned on in response to a first scan signal during the initialization period to the discharge period and are turned off during the sampling period; and the second switching TFTs of the two pixels are turned on in response to a second scan signal during the initialization period and the discharge period and are turned off during the precharge period and the sampling period.

12. The method according to claim 10, wherein:

the 2N pixels that share the reference line include two pixels located on both sides of the shared reference line between two neighboring data lines and respectively connected to the two data lines;

the first switching TFTs of the two pixels are turned on in response to a first scan signal during the initialization period to the discharge period and are turned off during the sampling period;

the second switching TFTs of the two pixels are turned on in response to second and third scan signals, respectively, during the initialization period and are turned off during the precharge period and the sampling period; and the second switching TFT of a pixel to be sensed from the two pixels is turned on and the second TFT of the other pixel is turned off during the discharge period.

13. The method according to claim 10, wherein:

the reference line is branched to N branch reference lines; and every two pixels from among the 2N pixels that share the reference line share the N branch reference lines, the two pixels being located on both sides of the shared branch reference lines between two neighboring data lines and respectively connected to the two data lines, the first switching TFTs of the two pixels being turned on in response to a first scan signal during the initialization period to the discharge period and turned off during the sampling period, the second switching TFTs of the two pixels being turned on in response to a second scan signal during the initialization period and the discharge period and turned off during the precharge period and the sampling period.

14. The method according to claim 10, wherein each of the time division sensing periods includes:

outputting the data signal through a data channel individually connected to the data line and outputting the reference signal to a reference channel individually connected to the reference line during the initialization period;

maintaining output of the data signal through the data channel and outputting a precharge voltage through the reference channel during the precharge period;

outputting the data signal through the data channel and outputting the reference signal through the reference channel during the discharge period;

blocking output of the data signal and reference signal, sampling and holding currents of the time-division-driven pixels through the reference channel as voltages during the sampling period; and converting the held voltage into digital data and outputting the digital data after the sampling period.

15. The method according to claim 14, wherein at least two reference channels are selectively connected to an input channel of the sample and hold unit through a multiplexer.

* * * * *